US012634956B2

(12) United States Patent
Sridharan et al.

(10) Patent No.: US 12,634,956 B2
(45) Date of Patent: May 19, 2026

(54) TRANSPORT BLOCK TRANSMISSION OVER MULTIPLE SLOTS WITH SUBBAND FULL DUPLEX OPERATION

(71) Applicant: QUALCOMM Incorporated, San Diego, CA (US)

(72) Inventors: Gokul Sridharan, Sunnyvale, CA (US); Muhammad Sayed Khairy Abdelghaffar, San Jose, CA (US); Ahmed Attia Abotabl, San Diego, CA (US); Abdelrahman Mohamed Ahmed Mohamed Ibrahim, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 474 days.

(21) Appl. No.: 18/296,909

(22) Filed: Apr. 6, 2023

(65) Prior Publication Data

US 2024/0340915 A1 Oct. 10, 2024

(51) Int. Cl.
*H04W 72/232* (2023.01)
*H04L 5/14* (2006.01)
*H04W 72/044* (2023.01)

(52) U.S. Cl.
CPC ............. *H04W 72/232* (2023.01); *H04L 5/14* (2013.01); *H04W 72/044* (2013.01)

(58) Field of Classification Search
CPC ....... H04L 5/0044; H04L 5/0094; H04L 5/14; H04W 72/044; H04W 72/0446; H04W 72/23; H04W 72/232
See application file for complete search history.

(56) References Cited

U.S. PATENT DOCUMENTS

| | | | | |
|---|---|---|---|---|
| 12,081,482 B1 * | 9/2024 | Ibrahim | ................ | H04L 5/0051 |
| 12,408,180 B2 * | 9/2025 | Abdelghaffar | ............ | H04L 5/14 |
| 12,489,572 B2 * | 12/2025 | Ibrahim | ............ | H04W 72/0446 |
| 2023/0199730 A1 * | 6/2023 | Rudolf | .................. | H04L 1/0025 370/329 |

(Continued)

FOREIGN PATENT DOCUMENTS

| | | | | | |
|---|---|---|---|---|---|
| CN | 118923180 A | * | 11/2024 | ........ | H04W 72/0446 |
| EP | 4395219 A1 | * | 7/2024 | ......... | H04L 27/2602 |

(Continued)

*Primary Examiner* — Eric Nowlin

(74) *Attorney, Agent, or Firm* — Holland & Hart LLP

(57) ABSTRACT

Methods, systems, and devices for wireless communications are described. Techniques described herein support transmission of a transport block over multiple slots (TBoMS) with subband full duplex (SBFD) operation. For example, if a time domain resource allocation for a TBoMS includes both uplink slots and downlink slots configured with an uplink subband, a user equipment (UE) may determine which slots to use in accordance with a scheme for selecting available slots for the TBoMS from indicated candidate slots, and the UE may determine the transport block size based on the selected slots. In some examples, the UE may first determine the quantity of resource elements available in each of the different slot types, and then may determine the transport block size based on the quantity of resource elements available in each of the different slot types and the quantity of each of the different slot types.

18 Claims, 16 Drawing Sheets

(56)     References Cited

U.S. PATENT DOCUMENTS

| | | | | |
|---|---|---|---|---|
| 2023/0328706 A1* | 10/2023 | Cozzo | .................. | H04L 5/0094 |
| 2024/0098760 A1* | 3/2024 | Abotabl | ............... | H04L 5/0092 |
| 2024/0179692 A1* | 5/2024 | Xiong | ............. | H04W 72/0446 |
| 2024/0188001 A1* | 6/2024 | Su | ......................... | H04W 52/38 |
| 2024/0224240 A1* | 7/2024 | Yoshimura | .......... | H04W 72/044 |
| 2024/0259169 A1* | 8/2024 | Ibrahim | ................. | H04L 5/001 |
| 2024/0283602 A1* | 8/2024 | Ibrahim | ............... | H04L 5/0051 |
| 2024/0284465 A1* | 8/2024 | Abdelghaffar | ............ | H04L 5/14 |
| 2024/0284476 A1* | 8/2024 | Sridharan | ............. | H04L 5/0044 |
| 2024/0291625 A1* | 8/2024 | Zhou | .................... | H04L 5/0053 |
| 2024/0334425 A1* | 10/2024 | Abdelghaffar | ............ | H04L 5/14 |
| 2024/0349264 A1* | 10/2024 | Liu | ......................... | H04L 25/02 |
| 2024/0372661 A1* | 11/2024 | Park | ..................... | H04L 5/0044 |
| 2025/0226852 A1* | 7/2025 | Lu | ......................... | H04W 72/12 |
| 2025/0227668 A1* | 7/2025 | Zhao | .................... | H04W 72/12 |

FOREIGN PATENT DOCUMENTS

| | | | | | |
|---|---|---|---|---|---|
| JP | 2024510623 A | * | 3/2024 | ............... | H04L 1/08 |
| JP | 2024514256 A | * | 3/2024 | ......... | H04W 52/242 |
| KR | 20240106897 A | * | 7/2024 | ......... | H04L 27/2602 |
| KR | 20240122877 A | * | 8/2024 | ........... | H04L 1/0025 |
| KR | 20240172183 A | * | 12/2024 | ........... | H04L 5/0092 |
| WO | WO-2022204159 A1 | * | 9/2022 | ........... | H04W 72/23 |
| WO | WO-2022208490 A1 | * | 10/2022 | ........... | H04W 52/38 |
| WO | WO-2023113519 A1 | * | 6/2023 | ........... | H04L 1/0025 |
| WO | WO-2023195760 A1 | * | 10/2023 | ........... | H04L 5/0092 |
| WO | WO-2024035330 A1 | * | 2/2024 | ........... | H04L 5/0044 |
| WO | WO-2024197701 A1 | * | 10/2024 | ....... | H04W 72/0446 |
| WO | WO-2024197701 A9 | * | 7/2025 | ....... | H04W 72/0446 |

* cited by examiner

205

215

210

220

105-a 110-a 115-a 225-a    225-b    225-c    225-d

Uplink

Downlink

Full Duplex

200

Resource Allocation Manager

1225

Transport Block
Receiving  Manager

1235

Information Bits Manager

1245

Available Slots Manager

1230

Uplink Slots Manager

1240

1220

1200

130    105    115

Network
Entity

Transceiver    Antenna 1310    1315

Communications
Manager

Memory

Code

1330

1320    1325

1340

Processor

1335

1305

1300

Figure 14:
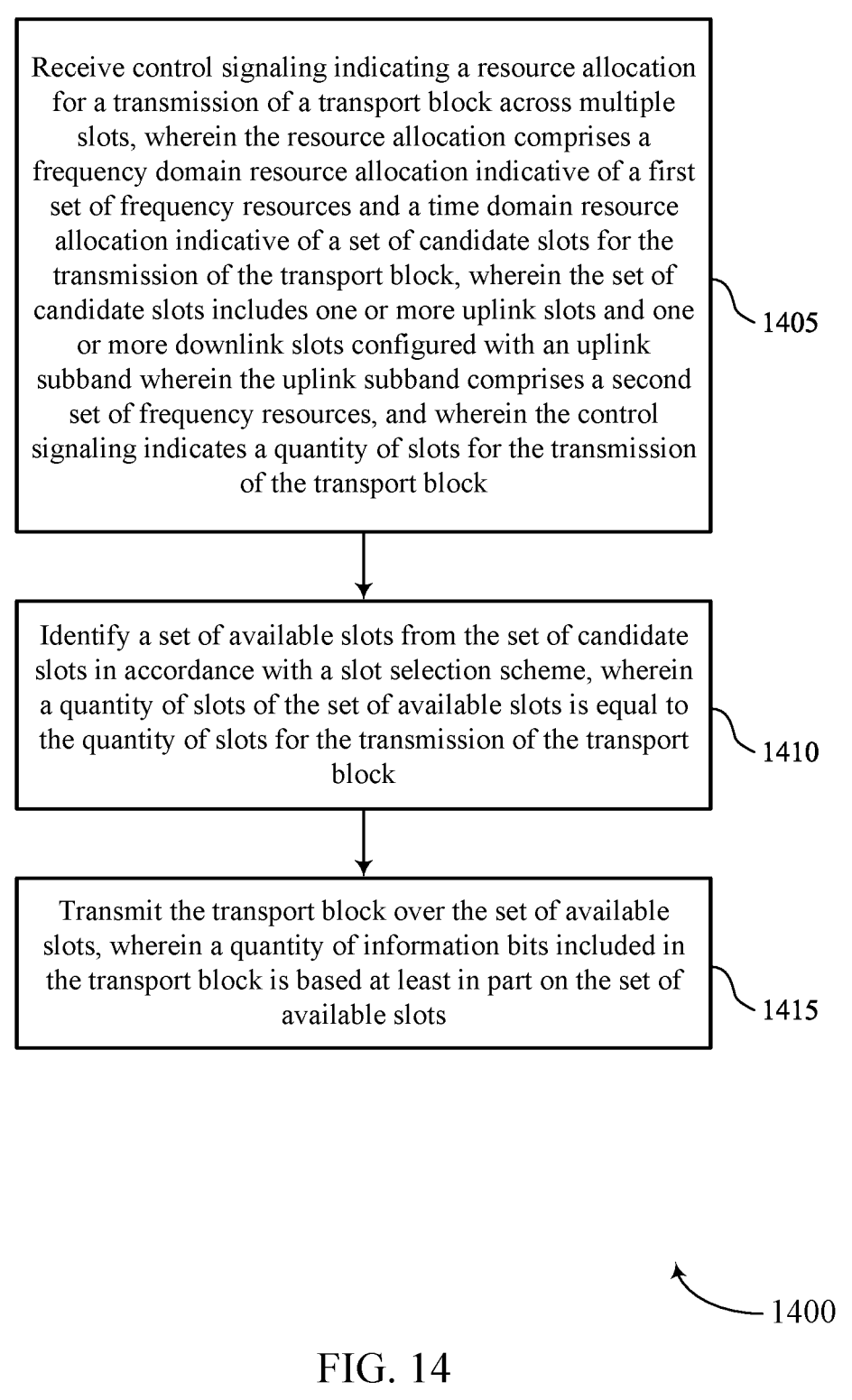

Receive control signaling indicating a resource allocation for a transmission of a transport block across multiple slots, wherein the resource allocation comprises a frequency domain resource allocation indicative of a first set of frequency resources and a time domain resource allocation indicative of a set of candidate slots for the transmission of the transport block, wherein the set of candidate slots includes one or more uplink slots and one or more downlink slots configured with an uplink subband wherein the uplink subband comprises a second set of frequency resources, and wherein the control signaling indicates a quantity of slots for the transmission of the transport block

1405

Identify a set of available slots from the set of candidate slots in accordance with a slot selection scheme, wherein a quantity of slots of the set of available slots is equal to the quantity of slots for the transmission of the transport block

1410

Transmit the transport block over the set of available slots, wherein a quantity of information bits included in the transport block is based at least in part on the set of available slots

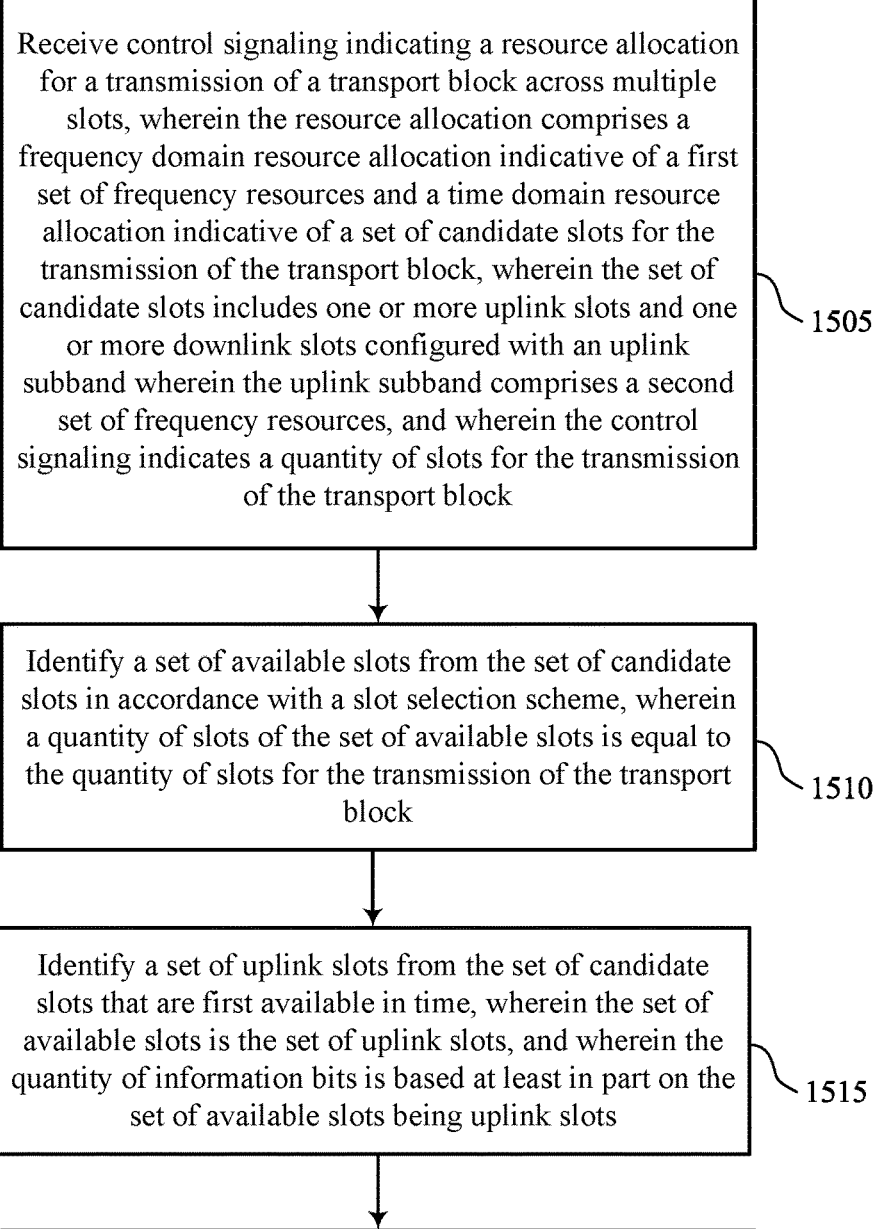

Receive control signaling indicating a resource allocation for a transmission of a transport block across multiple slots, wherein the resource allocation comprises a frequency domain resource allocation indicative of a first set of frequency resources and a time domain resource allocation indicative of a set of candidate slots for the transmission of the transport block, wherein the set of candidate slots includes one or more uplink slots and one or more downlink slots configured with an uplink subband wherein the uplink subband comprises a second set of frequency resources, and wherein the control signaling indicates a quantity of slots for the transmission of the transport block

1505

Identify a set of available slots from the set of candidate slots in accordance with a slot selection scheme, wherein a quantity of slots of the set of available slots is equal to the quantity of slots for the transmission of the transport block

1510

Identify a set of uplink slots from the set of candidate slots that are first available in time, wherein the set of available slots is the set of uplink slots, and wherein the quantity of information bits is based at least in part on the set of available slots being uplink slots

1515

Transmit the transport block over the set of available slots, wherein a quantity of information bits included in the transport block is based at least in part on the set of available slots

Figure 16:
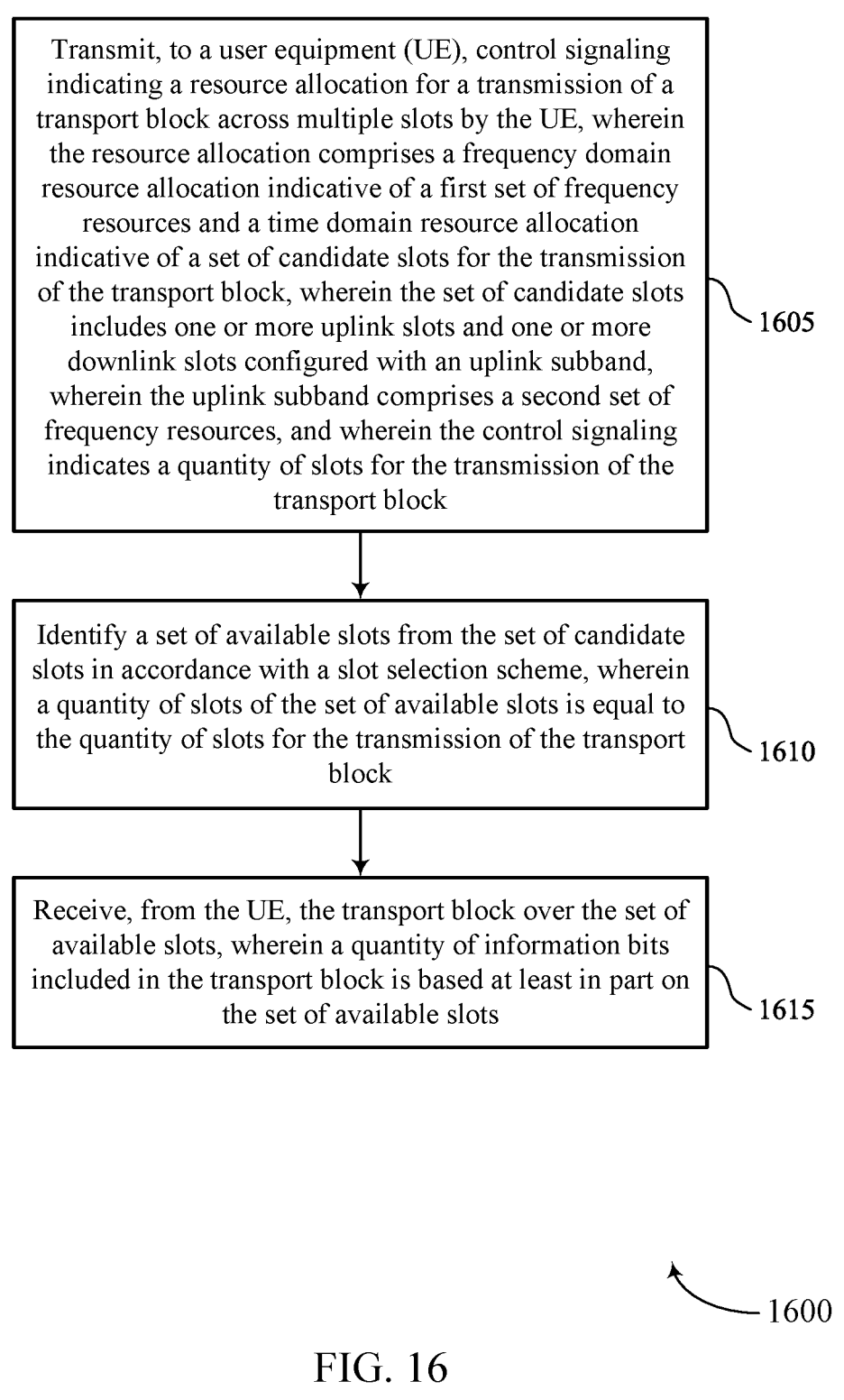

Transmit, to a user equipment (UE), control signaling indicating a resource allocation for a transmission of a transport block across multiple slots by the UE, wherein the resource allocation comprises a frequency domain resource allocation indicative of a first set of frequency resources and a time domain resource allocation indicative of a set of candidate slots for the transmission of the transport block, wherein the set of candidate slots includes one or more uplink slots and one or more downlink slots configured with an uplink subband, wherein the uplink subband comprises a second set of frequency resources, and wherein the control signaling indicates a quantity of slots for the transmission of the transport block

~ 1605

↓

Identify a set of available slots from the set of candidate slots in accordance with a slot selection scheme, wherein a quantity of slots of the set of available slots is equal to the quantity of slots for the transmission of the transport block

~ 1610

↓

Receive, from the UE, the transport block over the set of available slots, wherein a quantity of information bits included in the transport block is based at least in part on the set of available slots

TRANSPORT BLOCK TRANSMISSION OVER MULTIPLE SLOTS WITH SUBBAND FULL DUPLEX OPERATION

FIELD OF TECHNOLOGY

The following relates to wireless communications, including transport block transmission over multiple slots with subband full duplex operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support transmission of a transport block over multiple slots (TBoMS) with subband full duplex (SBFD) operation. For example, if a time domain resource allocation for a TBoMS includes both uplink slots and downlink slots configured with an uplink subband (e.g., an SBFD slot), the UE may determine which slots to use in accordance with a scheme for selecting available slots for the TBoMS from indicated candidate slots, and the UE may determine the transport block size based on the selected slots. In some examples, the scheme may involve selecting slots of the same slot type. As another example, the UE may select the first available slots regardless of whether the first slots include different slot types. In some examples where the UE selects the first available slots regardless of whether the first slots include different slot types, the UE may first determine the quantity of resource elements available in each of the different slot types, and then may determine the transport block size based on the quantity of resource elements available in each of the different slot types and the quantity of each of the different slot types.

A method for wireless communications at a user equipment (UE) is described. The method may include receiving control signaling indicating a resource allocation for a transmission of a transport block (TB) across multiple slots, where the resource allocation includes a frequency domain resource allocation (FDRA) indicative of a first set of frequency resources and a time domain resource allocation (TDRA) indicative of a set of candidate slots for the transmission of the TB, where the set of candidate slots includes one or more uplink slots and one or more downlink slots configured with an uplink subband, where the uplink subband includes a second set of frequency resources, and where the control signaling indicates a quantity of slots for the transmission of the TB, identifying a set of available slots from the set of candidate slots in accordance with a slot selection scheme, where a quantity of slots of the set of available slots is equal to the quantity of slots for the transmission of the transport block, and transmitting the TB over the set of available slots, where a quantity of information bits included in the TB is based on the set of available slots.

An apparatus for wireless communications at a UE is described. The apparatus may include a processor, memory coupled with the processor, and instructions stored in the memory. The instructions may be executable by the processor to cause the apparatus to receive control signaling indicating a resource allocation for a transmission of a TB across multiple slots, where the resource allocation includes a FDRA indicative of a first set of frequency resources and a FDRA indicative of a set of candidate slots for the transmission of the TB, where the set of candidate slots includes one or more uplink slots and one or more downlink slots configured with an uplink subband, where the uplink subband includes a second set of frequency resources, and where the control signaling indicates a quantity of slots for the transmission of the TB, identify a set of available slots from the set of candidate slots in accordance with a slot selection scheme, where a quantity of slots of the set of available slots is equal to the quantity of slots for the transmission of the TB, and transmit the TB over the set of available slots, where a quantity of information bits included in the TB is based on the set of available slots.

Another apparatus for wireless communications at a UE is described. The apparatus may include means for receiving control signaling indicating a resource allocation for a transmission of a TB across multiple slots, where the resource allocation includes a FDRA indicative of a first set of frequency resources and a FDRA indicative of a set of candidate slots for the transmission of the TB, where the set of candidate slots includes one or more uplink slots and one or more downlink slots configured with an uplink subband, where the uplink subband includes a second set of frequency resources, and where the control signaling indicates a quantity of slots for the transmission of the TB, means for identifying a set of available slots from the set of candidate slots in accordance with a slot selection scheme, where a quantity of slots of the set of available slots is equal to the quantity of slots for the transmission of the TB, and means for transmitting the TB over the set of available slots, where a quantity of information bits included in the TB is based on the set of available slots.

A non-transitory computer-readable medium storing code for wireless communications at a UE is described. The code may include instructions executable by a processor to receive control signaling indicating a resource allocation for a transmission of a TB across multiple slots, where the resource allocation includes a FDRA indicative of a first set of frequency resources and a FDRA indicative of a set of candidate slots for the transmission of the TB, where the set of candidate slots includes one or more uplink slots and one or more downlink slots configured with an uplink subband, where the uplink subband includes a second set of frequency resources, and where the control signaling indicates a quantity of slots for the transmission of the TB, identify a set of available slots from the set of candidate slots in accordance with a slot selection scheme, where a quantity of slots of the set of available slots is equal to the quantity of slots for the transmission of the TB, and transmit the TB over the set of available slots, where a quantity of information bits included in the TB is based on the set of available slots.

In some examples of the method, apparatuses, and non-transitory computer-readable medium described herein, identifying the set of available slots from the set of candidate slots in accordance with the slot selection scheme may include operations, features, means, or instructions for identifying a set of uplink slots from the set of candidate slots that may be first available in time, where the set of available slots may be the set of uplink slots, and where the quantity of information bits may be based on the set of available slots being uplink slots.

Some examples of the method, apparatuses, and non-transitory computer-readable medium described herein may further include operations, features, means, or instructions for determining the quantity of information bits based on a first quantity of uplink slots included in the set of candidate slots and a second quantity of downlink slots configured with the uplink subband included in the set of candidate slots.

In some examples of the method, apparatuses, and non-transitory computer-readable medium described herein, determining the quantity of information bits may include operations, features, means, or instructions for determining, based on the first set of frequency resources, a first quantity of resource elements (REs) available for transmission of information bits in each uplink slot and determining, based on an overlap between the first set of frequency resources and the second set of frequency resources, a second quantity of REs available for transmission of information bits in each downlink slot configured with the uplink subband.

Some examples of the method, apparatuses, and non-transitory computer-readable medium described herein may further include operations, features, means, or instructions for determining the quantity of information bits based on a determination of a quantity of REs available for transmission of information bits in each slot of the set of candidate slots based on the first set of frequency resources, where the set of available slots includes at least one uplink slot and at least one downlink slot configured with the uplink subband.

Some examples of the method, apparatuses, and non-transitory computer-readable medium described herein may further include operations, features, means, or instructions for determining the quantity of information bits based on a determination of a quantity of REs available for transmission of information bits in each slot of the set of candidate slots based on a minimum between the first set of frequency resources and the second set of frequency resources, where the set of available slots includes at least one uplink slot and at least one downlink slot configured with the uplink subband.

In some examples of the method, apparatuses, and non-transitory computer-readable medium described herein, identifying the set of available slots from the set of candidate slots in accordance with the slot selection scheme may include operations, features, means, or instructions for identifying a set of slots from the set of candidate slots that may be first available in time, the set of slots including at least one uplink slot and at least one downlink slots configured with the uplink subband.

In some examples of the method, apparatuses, and non-transitory computer-readable medium described herein, identifying the set of available slots from the set of candidate slots in accordance with the slot selection scheme may include operations, features, means, or instructions for identifying a set of downlink slots configured with the uplink subband from the set of candidate slots that may be first available in time, where the set of available slots may be the set of downlink slots configured with the uplink subband.

In some examples of the method, apparatuses, and non-transitory computer-readable medium described herein, the quantity of information bits may be based on the uplink subband including the second set of frequency resources.

In some examples of the method, apparatuses, and non-transitory computer-readable medium described herein, receiving the control signaling may include operations, features, means, or instructions for receiving a downlink control information indicating the resource allocation.

In some examples of the method, apparatuses, and non-transitory computer-readable medium described herein, the candidate set of slots include slots scheduled after a duration after reception of the control signaling.

A method for wireless communications at a network entity is described. The method may include transmitting, to a UE, control signaling indicating a resource allocation for a transmission of a TB across multiple slots by the UE, where the resource allocation includes a FDRA indicative of a first set of frequency resources and a FDRA indicative of a set of candidate slots for the transmission of the TB, where the set of candidate slots includes one or more uplink slots and one or more downlink slots configured with an uplink subband, where the uplink subband includes a second set of frequency resources, and where the control signaling indicates a quantity of slots for the transmission of the TB, identifying a set of available slots from the set of candidate slots in accordance with a slot selection scheme, where a quantity of slots of the set of available slots is equal to the quantity of slots for the transmission of the TB, and receiving, from the UE, the TB over the set of available slots, where a quantity of information bits included in the TB is based on the set of available slots.

An apparatus for wireless communications at a network entity is described. The apparatus may include a processor, memory coupled with the processor, and instructions stored in the memory. The instructions may be executable by the processor to cause the apparatus to transmit, to a UE, control signaling indicating a resource allocation for a transmission of a TB across multiple slots by the UE, where the resource allocation includes a FDRA indicative of a first set of frequency resources and a FDRA indicative of a set of candidate slots for the transmission of the TB, where the set of candidate slots includes one or more uplink slots and one or more downlink slots configured with an uplink subband, where the uplink subband includes a second set of frequency resources, and where the control signaling indicates a quantity of slots for the transmission of the TB, identify a set of available slots from the set of candidate slots in accordance with a slot selection scheme, where a quantity of slots of the set of available slots is equal to the quantity of slots for the transmission of the TB, and receive, from the UE, the TB over the set of available slots, where a quantity of information bits included in the TB is based on the set of available slots.

Another apparatus for wireless communications at a network entity is described. The apparatus may include means for transmitting, to a UE, control signaling indicating a resource allocation for a transmission of a TB across multiple slots by the UE, where the resource allocation includes a FDRA indicative of a first set of frequency resources and a FDRA indicative of a set of candidate slots for the transmission of the TB, where the set of candidate slots includes one or more uplink slots and one or more downlink slots configured with an uplink subband, where the uplink subband includes a second set of frequency resources, and where the control signaling indicates a quantity of slots for the transmission of the TB, means for identifying a set of available slots from the set of candidate slots in accordance with a slot selection scheme, where a quantity of slots of the set of available slots is equal to the quantity of slots for the transmission of the TB, and means for receiving, from the UE, the TB over the set of available slots, where a quantity of information bits included in the TB is based on the set of available slots.

A non-transitory computer-readable medium storing code for wireless communications at a network entity is described. The code may include instructions executable by a processor to transmit, to a UE, control signaling indicating a resource allocation for a transmission of a TB across multiple slots by the UE, where the resource allocation includes a FDRA indicative of a first set of frequency resources and a FDRA indicative of a set of candidate slots for the transmission of the TB, where the set of candidate slots includes one or more uplink slots and one or more downlink slots configured with an uplink subband, where the uplink subband includes a second set of frequency resources, and where the control signaling indicates a quantity of slots for the transmission of the TB, identify a set of available slots from the set of candidate slots in accordance with a slot selection scheme, where a quantity of slots of the set of available slots is equal to the quantity of slots for the transmission of the TB, and receive, from the UE, the TB over the set of available slots, where a quantity of information bits included in the TB is based on the set of available slots.

In some examples of the method, apparatuses, and non-transitory computer-readable medium described herein, identifying the set of available slots from the set of candidate slots in accordance with the slot selection scheme may include operations, features, means, or instructions for identifying a set of uplink slots from the set of candidate slots that may be first available in time, where the set of available slots may be the set of uplink slots, and where the quantity of information bits may be based on the set of available slots being uplink slots.

Some examples of the method, apparatuses, and non-transitory computer-readable medium described herein may further include operations, features, means, or instructions for determining the quantity of information bits based on a first quantity of uplink slots included in the set of candidate slots and a second quantity of downlink slots configured with the uplink subband included in the set of candidate slots.

Some examples of the method, apparatuses, and non-transitory computer-readable medium described herein may further include operations, features, means, or instructions for determining, based on the first set of frequency resources, a first quantity of REs available for transmission of information bits in each uplink slot and determining, based on an overlap between the first set of frequency resources and the second set of frequency resources, a second quantity of REs available for transmission of information bits in each downlink slot configured with the uplink subband.

Some examples of the method, apparatuses, and non-transitory computer-readable medium described herein may further include operations, features, means, or instructions for determining the quantity of information bits based on a determination of a quantity of REs available for transmission of information bits in each slot of the set of candidate slots based on the first set of frequency resources, where the set of available slots includes at least one uplink slot and at least one downlink slot configured with the uplink subband.

Some examples of the method, apparatuses, and non-transitory computer-readable medium described herein may further include operations, features, means, or instructions for determining the quantity of information bits based on a determination of a quantity of REs available for transmission of information bits in each slot of the set of candidate slots based on a minimum between the first set of frequency resources and the second set of frequency resources, where the set of available slots includes at least one uplink slot and at least one downlink slot configured with the uplink subband.

In some examples of the method, apparatuses, and non-transitory computer-readable medium described herein, identifying the set of available slots from the set of candidate slots in accordance with the slot selection scheme may include operations, features, means, or instructions for identifying a set of slots from the set of candidate slots that may be first available in time, the set of slots including at least one uplink slot and at least one downlink slots configured with the uplink subband.

In some examples of the method, apparatuses, and non-transitory computer-readable medium described herein, identifying the set of available slots from the set of candidate slots in accordance with the slot selection scheme may include operations, features, means, or instructions for identifying a set of downlink slots configured with the uplink subband from the set of candidate slots that may be first available in time, where the set of available slots may be the set of downlink slots configured with the uplink subband.

In some examples of the method, apparatuses, and non-transitory computer-readable medium described herein, the quantity of information bits may be based on the uplink subband including the second set of frequency resources.

In some examples of the method, apparatuses, and non-transitory computer-readable medium described herein, transmitting the control signaling may include operations, features, means, or instructions for transmitting a downlink control information indicating the resource allocation.

In some examples of the method, apparatuses, and non-transitory computer-readable medium described herein, the candidate set of slots include slots scheduled after a duration after transmission of the control signaling.

BRIEF DESCRIPTION OF THE DRAWINGS

FIGS. 14 through 16 show flowcharts illustrating methods that support TBoMS with SBFD operation in accordance with one or more aspects of the present disclosure.

DETAILED DESCRIPTION

Figure 1:
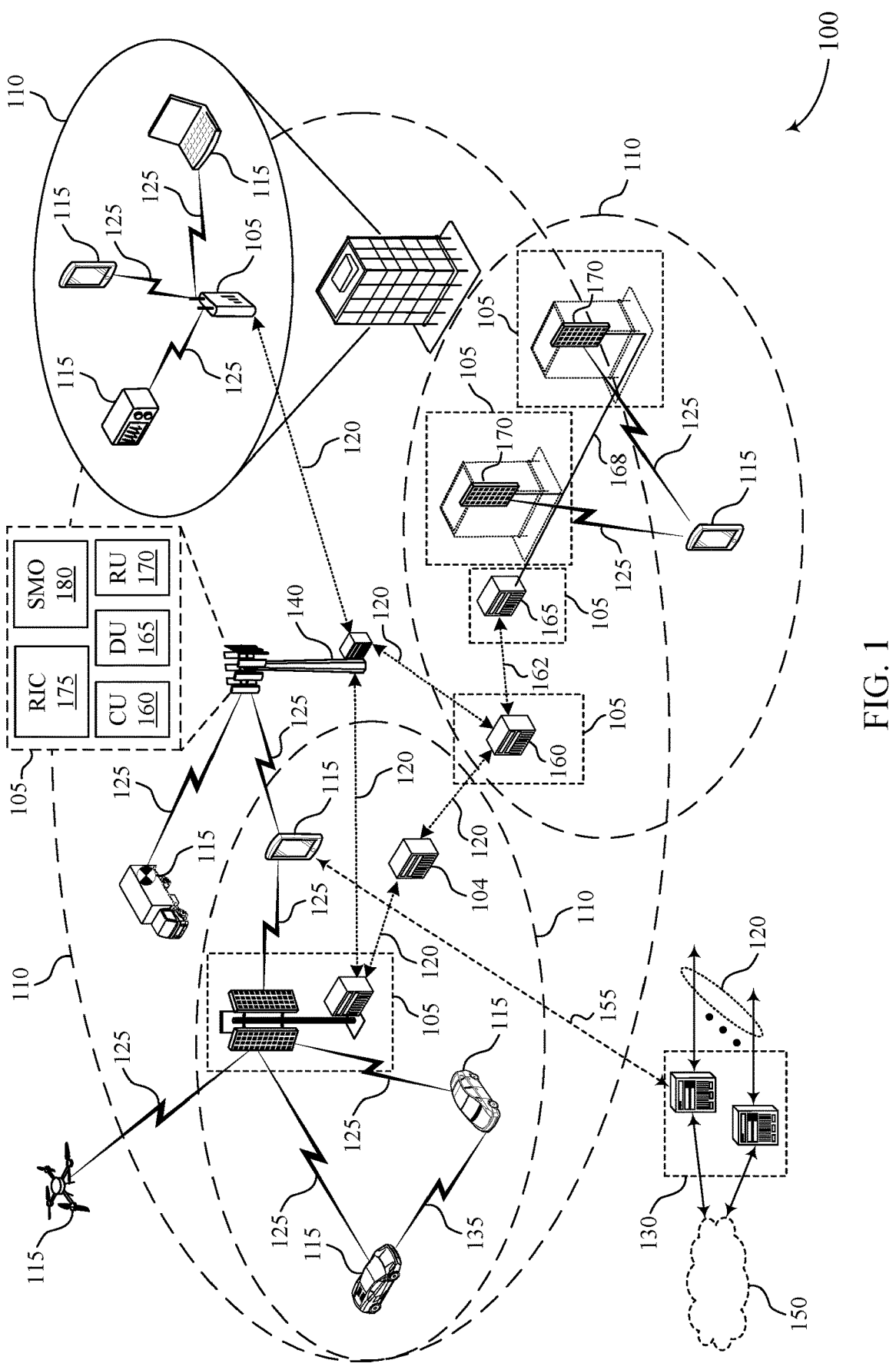
FIG. 1 shows an example of a wireless communications system that supports transport block transmission over multiple slots (TBoMS) with subband full duplex (SBFD) operation in accordance with one or more aspects of the present disclosure.

Wireless communication devices, such as a user equipment (UE) and a network entity, may support wireless communications over multiple time and frequency resources. In some cases, the UE and the network entity may support transmission of a transport block over multiple slots (referred to as TBoMS) based on a resource allocation of time and frequency resources. A transport block (TB) may include a payload, which may carry a quantity of information bits. For example, the UE may receive a downlink control information (DCI) which schedules the UE to transmit a TB over multiple slots and also indicates a frequency resource allocation for the TB. The UE may determine the TB size for the TB (e.g., the quantity of information bits to transmit over the TB) based on the total quantity of resources available (e.g., the quantity of symbols across the multiple slots and the frequency resources available in each slot), the coding rate, and the modulation order. In some cases, each slot may be an uplink slot, and accordingly the quantity of frequency resources available is the same in each slot of the TBOMS.

Some wireless communications systems, however, may implement subband full duplex (SBFD) operations, in which a downlink slot includes uplink frequency resources. For example, an SBFD downlink slot may include two downlink subbands separated by an uplink subband. If the time domain resource allocation (TDRA) for a TBoMS includes uplink slots and downlink slots configured with an uplink subband (e.g., an SBFD downlink slot), the quantity of frequency resources available in each slot for the transmission of the TB will be different. The TB size determination in such scenarios is currently undefined.

If the TDRA indicated by a DCI for a TBoMS includes both uplink slots and downlink slots configured with an uplink subband, the UE may determine which slots to use in accordance with a scheme or rule for selecting available slots for a TBoMS from indicated candidate slots, and then the UE may determine the TB size based on the selected slots. For example, the rule or scheme may involve selecting slots of the same type in order to simplify the TB size determination. For example, if the DCI indicates the TBoMS includes four slots, the UE may select the first four available uplink slots or the first four available downlink slots configured with uplink subbands, such that the frequency resources available in each slot of the TBoMS is the same. As another example, if the DCI indicates the TBoMS includes four slots, the UE may select the first four available slots regardless of whether the first four slots include different slot types. In some examples, where the UE selects the first available slots regardless of whether the first slots include different slot types, the UE may first determine the quantity of resource elements (REs) available in each of the different slot types, and then may determine the TB size based on the quantity of REs available in each of the different slot types and the quantity of each of the different slot types.

Aspects of the disclosure are initially described in the context of wireless communications systems. Additional aspects of the disclosure are described in the context of examples of wireless communications systems, examples of a bi-directional transmission and a circular buffer, examples of slots and an example process flow.

Aspects of the disclosure are further illustrated by and described with reference to apparatus diagrams, system diagrams, and flowcharts that relate to TBoMS with SBFD operation.

FIG. 1 shows an example of a wireless communications system 100 that supports TBoMS with SBFD operation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support TBoMS with SBFD operation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a RE may refer to resources of one symbol period (e.g., a duration of one modulation symbol) and one subcarrier, in which case the symbol period and subcarrier spacing may be inversely related. The quantity of bits carried by each RE may depend on the modulation scheme (e.g., the order of the modulation scheme, the coding rate of the modulation scheme, or both), such that a relatively higher quantity of REs (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A communication device, such as the UE 115 and the network entity 105, may support wireless communications over multiple time and frequency resources. In some cases, the UE 115 and the network entity 105 may support TBoMS based on a resource allocation of the time and frequency resources. A TB may include a payload, which may carry a quantity of information bits. For example, the UE 115 may receive a DCI from the network entity 105 which schedules the UE 115 to transmit a TB over multiple slots and also indicates a frequency resource allocation for the TB. The UE 115 may determine the TB size for the TB (e.g., the quantity of information bits to transmit over the TB) based on the total quantity of resources available (e.g., the quantity of symbols across the multiple slots and the frequency resources available in each slot), the coding rate, and the modulation order. In some cases, each slot may be an uplink slot, and accordingly the quantity of frequency resources available is the same in each slot of the TBoMS.

Some wireless communications systems, however, may implement SBFD operations, in which a downlink slot includes uplink frequency resources. For example, an SBFD downlink slot may include two downlink subbands separated by an uplink subband. If the TDRA for a TBoMS includes uplink slots and downlink slots configured with an uplink subband (e.g., an SBFD downlink slot), the quantity of frequency resources available in each slot for the transmission of the TB will be different. The TB block size determination in such scenarios is currently undefined.

If the TDRA indicated by a DCI for a TBoMS includes both uplink slots and downlink slots configured with an uplink subband, the UE 115 may determine which slots to use in accordance with a scheme or rule for selecting available slots for a TBoMS from indicated candidate slots, and then the UE 115 may determine the TB size based on the selected slots. For example, the rule or scheme may involve selecting slots of the same type in order to simplify the TB size determination. For example, if the DCI indicates the TBoMS includes four slots, the UE 115 may select the first four available uplink slots or the first four available downlink slots configured with uplink subbands, such that the frequency resources available in each slot of the TBoMS is the same. As another example, if the DCI indicates the TBoMS includes four slots, the UE 115 may select the first four available slots regardless of whether the first four slots include different slot types. In some examples where the UE 115 selects the first available slots regardless of whether the first slots include different slot types, the UE 115 may first determine the quantity of REs available in each of the different slot types, and then may determine the TB size based on the quantity of REs available in each of the different slot types and the quantity of each of the different slot types.

Some wireless communications systems may implement full duplex operations. In full duplex operation, a wireless device (e.g., UE 115 or network entity 105) may transmit and receive at the same time. Full duplex operations in time division duplex (TDD) bands may increase an uplink duty cycle providing latency improvement for access and integrated access and backhaul (IAB) links and may provide uplink coverage improvements. The full duplex operations may enhance system capacity and may enable flexible and dynamic uplink and downlink resource adaption according to uplink and downlink traffic.

Some wireless communications systems may implement SBFD operations. In SBFD operation, a wireless device (e.g., UE 115 or network entity 105) may transmit and receive at the same time but on different frequency resources. An SBFD downlink slot may be configured with an uplink subband. For example, the SBFD downlink slot may include two downlink subbands separated by an uplink subband. The downlink resources may be separated from the uplink resource in the frequency domain by a guard band. SBFD operations may enhance latency and uplink coverage via frequency division duplex (FDD) in TDD bands. SBFD operations may be suitable for macro cells with large transmission power.

Some wireless communications systems may implement single-frequency full duplex (SFFD) operations. In SFFD operations, the wireless device (e.g., network entity 105 or UE 115) may transmit and receive on the same time and on the same frequency resource. For example, downlink resources and uplink resources may fully overlap (e.g., the downlink resources and the uplink resources may share same time and/or frequency resources). SFFD operations may enhance flexibility of system operation and may be feasible when large spatial isolation is guaranteed.

In some examples, full duplex operation may be in-band full duplex (IBFD). For IBFD operations, the wireless device (e.g., network entity 105 or UE 115) may transmit and receive on the same time and on the same frequency resource. For example, downlink resources and uplink resources may share the same time and frequency resources, and the downlink resources and uplink resources may fully or partially overlap.

Figure 2:
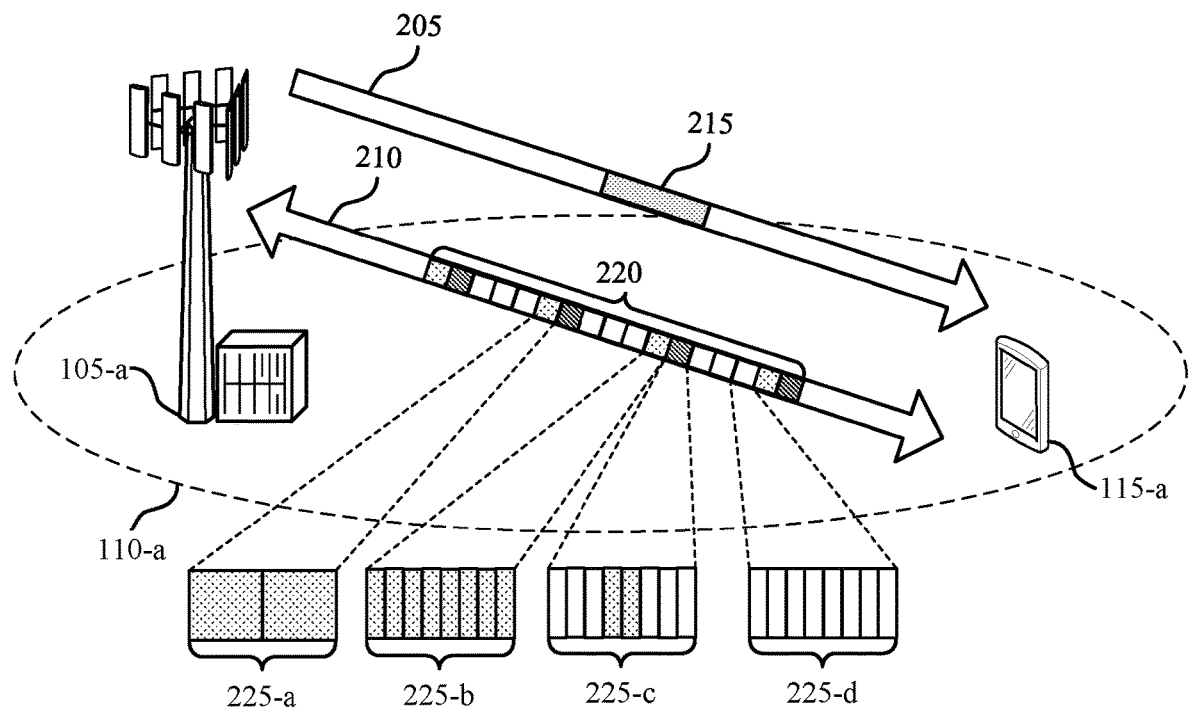
FIG. 2 shows an example of a wireless communications system that supports TBoMS with SBFD operation in accordance with one or more aspects of the present disclosure.

FIG. 2 shows an example of a wireless communications system 200 that supports TBoMS with SBFD operation in accordance with one or more aspects of the present disclosure. The wireless communications system 200 may implement or be implemented by aspects of the wireless communications system 100 as described in FIG. 1. For example, the wireless communications system 200 may include a network entity 105-a and a UE 115-a, which may be examples of a network entity 105 and a UE 115 as described with reference to FIG. 1. In the following description of the wireless communications system 200, the operations between the network entity 105-a and the UE 115-a may be transmitted or performed in different orders or at different times. Some operations or components may also be omitted from the wireless communications system 200, or other operations or components may be added to the wireless communications system 200.

One or more of the network entity 105-a or the UE 115-a may be equipped with multiple antennas, which may be used to employ techniques as described with reference to FIG. 1. The antennas of the network entity 105-a or the UE 115-a may be located within one or more antenna arrays or antenna panels, which may support operations as described herein. The network entity 105-a may have an antenna array with a number of rows and columns of antenna ports that the network entity 105-a may use to support wireless communications with the UE 115-a. Likewise, the UE 115-a may have one or more antenna arrays that may support various operations as described herein. Additionally, or alternatively, the UE 115-a may have an antenna array with a number of rows and columns of antenna ports that the UE 115-a may use to support wireless communications with the network entity 105-a.

In the example of FIG. 2, the network entity 105-a may perform wireless communication with the UE 115-a within a geographic coverage area 110-a. For example, the network entity 105-a and the UE 115-a may communicate a TB across multiple slots using a bi-directional communications link 210. In some examples, the TB may be associated with time and frequency resources. For example, the time and frequency resources may include a system bandwidth allocated into slots 225, in which the network entity 105-a and the UE 115-a may support transmission and reception of the TB across multiple slots. Each of one or more slots of the slots 225 may represent sub-slots, slots, subframes, or frame.

The network entity 105-a may provide control signaling 215 indicating a resource allocation for the transmission of the TB across multiple slots 220 to the UE 115-a over a communication link 205. The resource allocation may include a frequency domain resource allocation (FDRA) and a TDRA. The TDRA may indicate a set of candidate slots 225 for the transmission of the TB. The set of candidate slots 225 may include multiple uplink slots 225 (e.g., a slot 225-a and a slot 225-b) and multiple full duplex slots (e.g., slot 225-c). In some examples, the full duplex slot may be a downlink slot configured with an uplink subband (e.g., SBFD slot). In some examples, the set of slots 225 may include downlink slots 225 (e.g., slot 225-d). The set of candidate slots may refer to slots that occur after a point in time indicated in the control signaling 215 that schedules the TBoMS. The TDRA may indicate a set of symbols in a slot to use for the transmission of the TB and a quantity of slots for the transmission of the TB. The control signaling 215 indicating the resource allocation may be a downlink control information (DCI). In some examples, the resource allocation may be indicated using a combination of RRC and DCI signaling.

The UE 115-a may identify a set of available slots (e.g., uplink slots 225-b and downlink slots configured with the uplink subband 225-c) from the candidate slots 225 in accordance with a slot selection scheme for the transmission of the TB. A quantity of slots of the set of available slots may be equal to the quantity of slots for the transmission of the TB as indicated in the TDRA. The UE 115-a may determine a TB size or a quantity of information bits in the TB based on the set of available slots (e.g., uplink slots 225-b and downlink slots configured with the uplink subband 225-c).

The UE 115-a may transmit and the network entity 105-a may receive the TB over the set of available slots (e.g., uplink slots 225-b and downlink slots configured with the uplink subband 225-c) using the bi-directional communications link 210.

In some examples, each slot 225 of the slot set 220 may include the same number of resources (e.g., Type A TDRA)). Alternatively, one or more slots 225 of the slot set 220 may include a different number of resources than other slots 225 of the same slot set 220 (e.g., SBFD). For example, an uplink slot 225-a may include two symbols and an uplink slot 225-b may include eight symbols. In some examples, the number of resources for each slot 225 may be based on the slot type (e.g., uplink, downlink, or full duplex). For example, a full duplex slot 225-c may support both uplink and downlink transmissions and allocate one or more of the available resources to uplink and downlink, respectively. That is, the full duplex slot 225-c may have fewer uplink resources (e.g., two symbols) than an uplink slot 225-b (e.g., eight symbols). A downlink slot, such as slot 225-d, may only support downlink transmissions and allocate all available resources to downlink and have no uplink resources.

In some cases, the UE 115-a may allocate and transmit a number of coded bits (e.g., carried by a TB) across the slot set 220 based at least in part on the resource allocation of the slots 225. For example, a slot set 220 with the same number of resources in each slot 225 may enable the allocation and transmission of the same number of coded bits per slot 225. However, a slot set 220 with a different number of resources for one or more slots 225 may enable coded bit allocation and transmission using a per-slot rate matching technique. The UE 115-a may transmit the TB during one or more slots 225 (e.g., uplink slots, downlink slots configured with an uplink subband, or some combination thereof) of the slot set 220 to the network entity 105-a. In some cases, the UE 115-a may simultaneously receive transmissions during one or more slots 225 (e.g., downlink, full duplex, or some combination thereof) of the slot set 220 from the network entity 105-a.

Figure 3A:
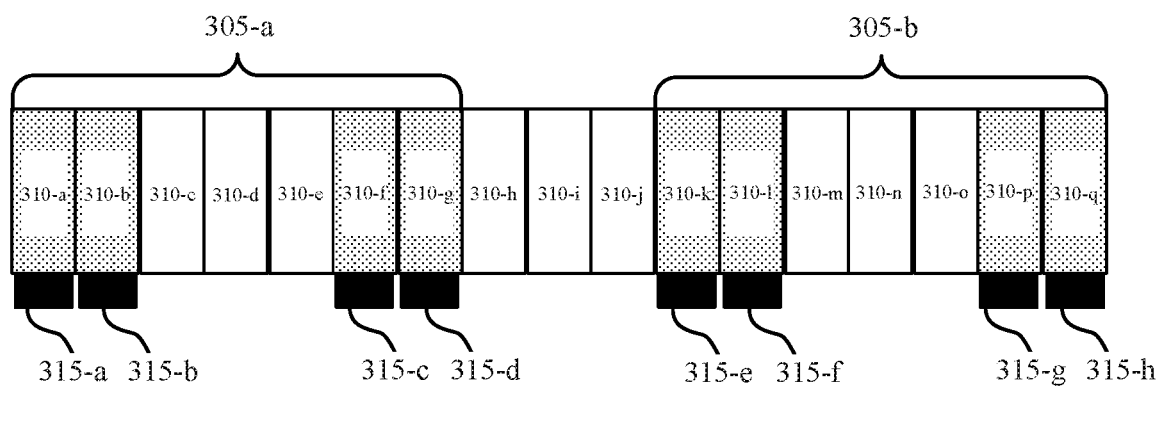
FIG. 3A shows an example of a bi-directional transmission that supports TBoMS with SBFD operation in accordance with one or more aspects of the present disclosure.
Figure 3A:

FIG. 3A shows an example of a bi-directional transmission 300-a that supports TBoMS with SBFD operation in accordance with one or more aspects of the present disclosure. In some examples, the bi-directional transmission 300-a may implement or be implemented by aspects of the wireless communications system 100 or wireless communications system 200, as described with reference to FIGS. 1 and 2, respectively. For example, the bi-directional transmission 300-*a* may be implemented by a network entity 105, a base station 140, and a UE 115, which may be an example of a network entity 105, a base station 140, and a UE 115 as described with reference to FIGS. 1 and 2, respectively. In the following description of the bi-directional transmission 300-*a*, the operations between a network entity 105, a base station 140, and UE 115 may be transmitted or performed in different orders or at different times. Some operations or components may also be omitted from the bi-directional transmission 300-*a*, or other operations or components may be added to the bi-directional transmission 300-*a*.

The bi-directional transmission 300-*a* may communicate the TB across multiple slots over a bi-directional communications link (e.g., between one or more of a network entity 105, a base station 140, or a UE 115). In some cases, the bi-directional transmission 300-*a* may occur over a set of slots, which may include two or more consecutive slots 310. In some examples, the set of slots may include uplink slots, downlink slots and downlink slots configured with an uplink subband. For example, the set of slots may include one or more uplink slots 310 (e.g., slot 310-*b*, slot 310-*g*, slot 310-*l*, and slot 310-*q*), downlink slots configured with uplink subband (e.g., slot 310-*c*, slot 310-*d*, slot 310-*e*, slot 310-*h*, slot 310-*i*, slot 310-*j*, slot 310-*m*, slot 310-*n*, and slot 310-*o*), or some combination thereof.

A UE 115 may transmit a TB 315 over one or more slots 310 of the set of slots. For example, the UE 115 may transmit the TB over one or more uplink slots (e.g., the slot 310-*a*, the slot 310-*b*, the slot 310-*f*, the slot 310-*g*, the slot 310-*k*, the slot 310-*l*, the slot 310-*p*, and the slot 310-*q*). In another example, the UE 115 may transmit the TB over one or more uplink slots and over one or more downlink slots configured with uplink subband (e.g., the slot 310-*a*, the slot 310-*b*, the slot 310-*c*, the slot 310-*d*, the slot 310-*e*, the slot 310-*f*, and the slot 310-*g*). In some examples, the TB 315 may be transmitted in portions (e.g., a first portion 315-*a*, a second portion 315-*b*, a third portion 315-*c*, a fourth portion 315-*d*, a fifth portion 315-*e*, a sixth portion 315-*f*, a seventh portion 315-*g*, and an eighth portion 315-*h*), and each portion 315 may be transmitted during a respective slot 310. For example, the first portion 315-*a* may be transmitted during the slot 310-*a*, the second portion 315-*b* may be transmitted during the slot 310-*b*, and so on.

In some cases, the TB 315 may include a payload, which may carry a number of coded bits or a quantity of information bits. In some examples, each portion of the TB 315 may have one or more associated bits of the total number of coded bits. In some cases, the number of associated bits for each portion of the TB 315 may be based on the resource allocation across the slots 310. For example, the resource allocation may include the same number of resources (e.g., symbols, subcarriers) in each uplink slot 310 of the set of time slots. In this case, the same number of coded bits may be transmitted across each uplink slot 310.

In some cases, one or more of the slots 310 may be associated with an RV bundle or repetition (e.g., configured by an RV index). For example, a first RV bundle 305-*a* (e.g., RV0 index) may include a first subset of slots 310 (e.g., the slot 310-*a*, the slot 310-*b*, the slot 310-*c*, the slot 310-*d*, the slot 310-*e*, the slot 310-*f*, and the slot 310-*g*). Additionally, a second RV bundle 305-*b* (e.g., RV2 index) may include a second subset of slots 310 (e.g., the slot 310-*k*, the slot 310-*l*, the slot 310-*m*, the slot 310-*n*, the slot 310-*o*, the slot 310-*p*, and the slot 310-*q*). In some cases, the RV bundles 305 may be associated with one or more bits of the TB 315. For example, each uplink slot 310 may have one or more associated bits of the total number of coded bits of the TB 315, and the one or more associated bits may be based on the RV index associated with each respective slot.

In some cases, one or more bits associated with the first RV bundle 305-*a* may be associated with the second RV bundle 305-*b*. For example, the bits of RV bundle 305-*b* may be a retransmission or a redundant transmission of the bits transmitted in RV bundle 305-*a*. In some examples, the bits may be transmitted in a different order between the RV bundle 305-*a* and the RV bundle 305-*b*. For example, the bits associated with the slot 310-*a*, and consequently the first portion 315-*a* of RV bundle 305-*a* may be retransmitted and associated with the third uplink slot 310-*p*, and consequently the portion 315-*g* of RV bundle 305-*b*.

The UE 115 may determine how to transmit the coded bits over varied slots in order to preserve the TB. For example, the UE 115 may determine a starting bit for each slot (e.g., the first bit of a set of bits to be transmitted during each slot 310) and perform per-slot rate matching in order to transmit the complete TB 315 across multiple slots 310. In some cases, the UE 115 may determine a respective starting coded bit for each slot based on a number of resources allocated to each slot, which may be indicated by the grant. For example, for SBFD operation, the starting bit for each slot may be predetermined prior to the start of the TBoMS.

In some cases, the UE 115 may determine the starting coded bit based on the number of resources (e.g., symbols, resource blocks, and the like) of the respective slot 310. For example, the UE may determine the starting coded bit based on the resources indicated in the grant. Additionally, or alternatively, the UE 115 may determine the starting coded bit based on the number of resources (e.g., resource blocks) available in an SBFD slot (e.g., downlink slot configured with an uplink subband) being less than the number of resources indicated in the grant. In such an example, the UE may use the actual number of available resources per slot 310.

In some cases, the UE 115 may determine the starting coded bit based on the bit type. For example, the UE 115 may determine to transmit all of the systematic bits of the coded bits. In such an example, the UE 115 may start the TBoMS at an uplink slot to ensure that all systematic bits are transmitted. In some examples, the first available slot 310 for TBoMS may be an uplink slot. Additionally, or alternatively, if the RV index associated with the TBoMS is RV0, the first available slot 310 may be an uplink slot. In some cases, the RV index may be refreshed when the transmission switches between uplink and downlink (e.g., goes from a downlink slot 310 to an uplink slot 310, or goes from an uplink slot 310 to a downlink slot 310). Alternatively, the RV index may be refreshed when the transmission switches between a full duplex slot 310 and an uplink slot 310 (e.g., goes from a full duplex slot 310 to an uplink slot 310, or goes from an uplink slot 310 to a full duplex slot 310).

In some cases, when the set of consecutive slots include a mix of uplink slots 310 and full duplex slots 310, the UE 115 may use the full duplex slots 310 as available slots 310. In some examples, the starting coded bit may be an uplink slot associated with a particular RV index (e.g., RV0). In some other examples, the starting coded bit may be the first slot (e.g., uplink or full duplex) associated a particular RV index (e.g., RV0). In some cases, the UE 115 may not use mixed mode operation for TBoMS. For example, the UE 115 may only use uplink slots 310, or may only use full duplex slots 310. In such an example, the first available slot 310 may be based on the slot type selected by the UE 115.

In some cases, the UE 115 may determine the starting coded bit based on uplink control information (UCI) multiplexing. In some examples, UCI multiplexing may be considered for a subset of the slots (e.g., only the first slot). For UCI multiplexing over the TBoMS, the UE 115 may use the actual or nominal resources available for the TBoMS in order to compute the number of resources needed for the UCI. For example, the index of the starting coded bit ($s_k$) for a given slot (e.g., k) may be given a value where $s_k = s_{k-1} +$ $\text{offset}_{k-1}$. Additionally, $\text{offset}_{k-1} + N_{RE}^{k-1}*q*L(1-\alpha_{k-1})$, or off-set$_{k-1} = N_{RE}^{k-1}*q*L - G_{k-1}^{ACK} - G_{k-1}^{CSI-part1} - G_{k-1}^{CSI-part2} - G_{k-1}^{CG-UCI}$ where $s_1$ is set to the index of the starting bit of the RV index associated with a single TBoMS transmission. In such an example, $G_{k-1}^x$ denotes the resources used for each component of UCI. Additionally, $N_{RE}^{k-1}$ indicates the number of actual or nominal resources in a slot.

Figure 3B:
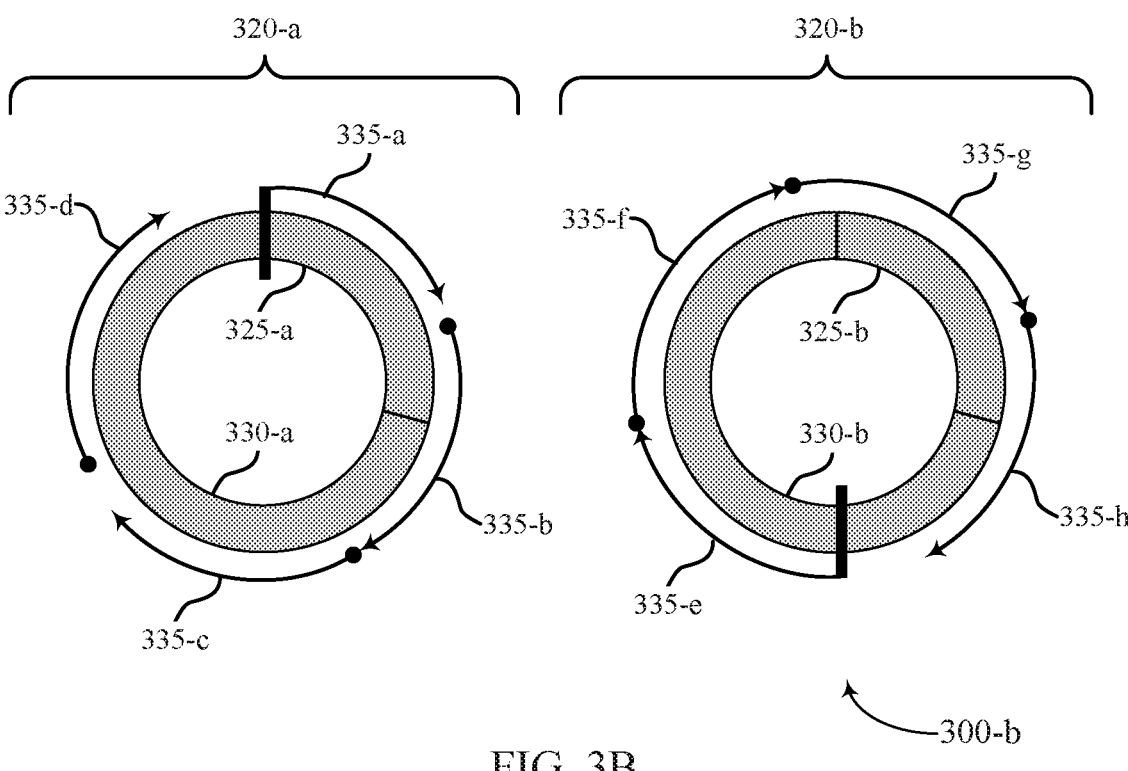
FIG. 3B shows an example of a circular buffer that supports TBoMS with SBFD operation in accordance with one or more aspects of the present disclosure

FIG. 3B shows an example of a circular buffer 300-b that supports TBoMS with SBFD operation in accordance with one or more aspects of the present disclosure. The circular buffer 300-b may implement or be implemented by aspects of the bi-directional transmission 300-a as described with reference to FIG. 3A. Additionally, the circular buffer 300-b may implement or be implemented by aspects of the wireless communications system 100 or wireless communications system 200, as described with reference to FIGS. 1 and 2, respectively. For example, the circular buffer 300-b may be implemented by a network entity 105, a base station 140, and a UE 115, which may be an example of a network entity 105, a base station 140, and a UE 115 as described with reference to FIGS. 1 and 2, respectively. In the following description of the circular buffer 300-b, the operations between a network entity 105, a base station 140, and UE 115 may be transmitted or performed in different orders or at different times. Some operations or components may also be omitted from the circular buffer 300-b, or other operations or components may be added to the circular buffer 300-b.

In the example of FIG. 3B, operation of the circular buffer 300-b may be implemented by a network entity 105, a base station 140, and a UE 115 may be based on a respective RV bundle, a repetition of bits, or an index, or a combination thereof. For example, an RV 320-a may be an example of an index type RV0 and an RV 320-b may be an example of an index type RV2, each of which may have a preconfigured handling of bits of for a TB 315. One or more bits of the RVs 320 may be systematic bits (e.g., 325-a and 325-b) which may also be referred to as a copy of a TB payload bits. Additionally, one or more other bits of the RVs 320 may be encoded bits of the TB (e.g., 330-a and 330-b), which may also be referred to as parity bits. The encoded bits 330 may be linearly derived from the systematic bits 325 and appended to the systematic bits 325. In some cases, a network entity 105, a base station 140, and a UE 115 may use the encoded bits 330 to determine the systematic bits 325.

Each RV 320 may include multiple sets of bits of the TB 315 bits. For example, the RV 320-a may include four segments (e.g., a first segment 335-a, a second segment 335-b, a third segment 335-c, and a fourth segment 335-d), and the RV 320-b may include four segments (e.g., a first segment 335-e, a second segment 335-f, a third segment 335-g, and a fourth segment 335-h) each associated with a respective set of bits (e.g., bits associated with TB portions including a first portion 315-a, a second portion 315-b, a third portion 315-c, a fourth portion 315-d, a fifth portion 315-e, a sixth portion 315-f, a seventh portion 315-g, or an eighth portion 315-h, with reference to FIG. 3A).

Each segment 335 may be associated with a slot for TBoMS. For example, with reference to FIG. 3A, the first segment 335-a may be associated with a first slot 310-a, the second segment 335-b may be associated with a second slot 310-b, the third segment 335-c may be associated with a third slot 310-f, and the fourth segment 335-d may be associated with a fourth slot 310-g. Bits for each slot 310 may be configured or handled within a respective segment 335. For example, bits of the first portion 315-a, transmitted during the first slot 310-a, may be handled by the first segment 335-a. In some cases, bits handled by the RV 320-a may be the same as the bits handled by the RV 320-b. For example, the bits handled by the RV 320-b may be a retransmission or a new transmission of the bits handled by the RV 320-a. In such an example, the bits of each RV 320 may be the same, but shifted to align with different segments 335. For example, one or more bits associated with the first segment 335-a of the RV 320-a (e.g., bits for a first slot) may also be associated with the third segment 335-g of the RV 320-b (e.g., bits for a third slot).

In some cases, there may be bits of the TB 315 which are not associated with a respective segment 335 or slot 310. For example, gaps may occur between one or more segments 335 (e.g., due to UCI multiplexing). In some cases, the starting point of each segment 335 may be precomputed or preconfigured. In some examples, the starting point of each segment 335 may indicate the starting bit of each respective slot 310. For example, using the starting point of each segment 335, or the starting bit of each associated slot 310, a network entity 105, a base station 140, and a UE 115 may determine the remaining bits of the respective slot 310.

Figure 4:
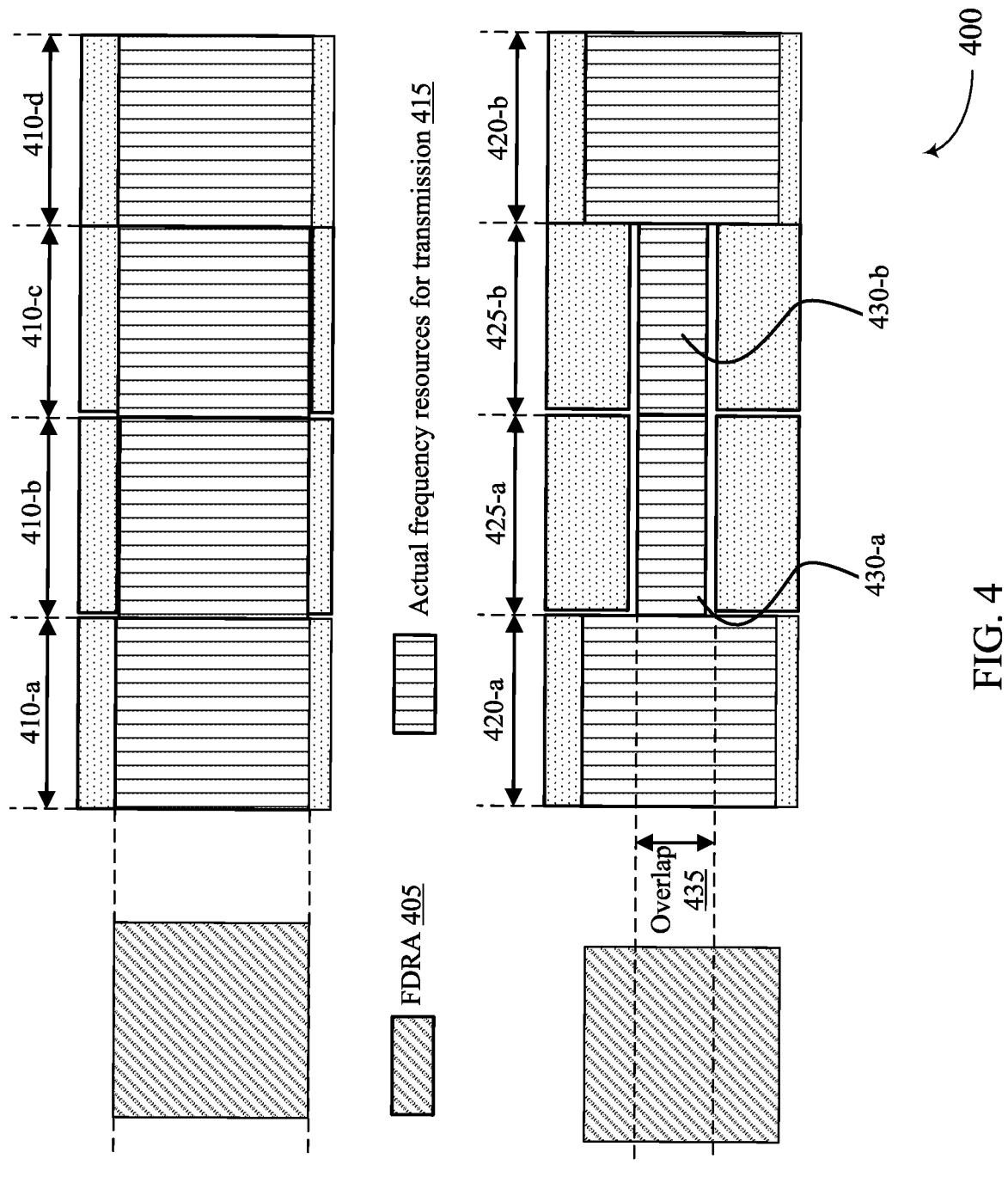
FIG. 4 shows examples of slots that supports TBoMS with SBFD operation in accordance with one or more aspects of the present disclosure.

FIG. 4 shows examples of slots 400 that supports TBoMS with SBFD operation in accordance with one or more aspects of the present disclosure. The slots 400 may implement or be implemented by aspects of the bi-directional transmission 300-a and circular buffer 300-b as described with reference to FIGS. 3A and 3B. Additionally, the slots 400 may implement or be implemented by aspects of the wireless communications system 100 or wireless communications system 200, as described with reference to FIGS. 1 and 2, respectively.

In some cases, the UE 115 may support TBoMS based on a resource allocation of the time and frequency resources. The TB may include a payload, which may carry a quantity of information bits. For example, the UE 115 may receive a DCI from the network entity 105 which schedules the UE 115 to transmit a TB over multiple slots and also indicates a FDRA 405 for the TB. The UE determines the TB size for the TB (e.g., the quantity of information bits to transmit over the TB) based on the total quantity of resources available (e.g., the quantity of symbols across the multiple slots and the frequency resources available in each slot), the coding rate, and the modulation order.

In some cases, the TDRA for the TBoMS may include the slots 400 including two or more consecutive uplink slots (e.g., slot 410-a, slot 410-b, slot 410-c, and slot 410-d). For the consecutive uplink slots, the quantity of frequency resources available or actual frequency resources available for the transmission 415 is the same in each slot of the TBoMS. For example, slot 410-a, slot 410-b, slot 410-c, and slot 410-d may each include the same number of symbols and PRBs in each slot.

Some wireless communications systems may implement SBFD operations, in which a downlink slot includes uplink frequency resources. For example, the SBFD downlink slot may include two downlink subbands separated by an uplink subband. In some examples, the TDRA for the TBoMS may include slots 400 including an uplink slot 420-a, a downlink slot 425-a with an uplink subband 430-a, a downlink slot 425-*b* with an uplink subband 430-*b*, and an uplink slot 420-*b*. If the TDRA for a TBoMS includes uplink slots and downlink slots configured with the uplink subband (e.g., an SBFD downlink slot), the quantity of frequency resources available (e.g., actual frequency resources for transmission 415) in each slot for the transmission of the TB is different.

In some examples, the UE 115 may receive, from the network entity 105, control signaling (e.g., DCI) indicating the resource allocation for the TBoMS. The resource allocation may include the FDRA and the TDRA indicative of a set of candidate slots for the transmission of the TB. The set of candidate slots may include both uplink slots 420-*a* and downlink slots 425-*a* configured with the uplink subband 430-*a*. The candidate slots may be the slots that occur after a point in time indicated in the control signaling that schedules the TBoMS. In some examples, the control signaling may indicate a quantity of slots for the transmission of the TB. The UE 115 may determine which slots to use of the set of candidate slots in accordance with a slot selection scheme or rule for selecting available slots for a TBoMS from the indicated candidate slots, and the UE 115 determines the TB size based on the selected slots.

In some examples, two cases for the slot selection scheme may be implemented. For the first case, a slot is available if the time and frequency resources are available, thus providing a uniform number of PRBs in each slot of the TBoMS. For the second case, a slot is available if the time resources are available, thus possibly providing a varying number of PRBs across different slots of the TBoMS.

For the first case, the UE 115 may determine slots (NK) for a physical uplink shared channel (PUSCH) transmission of TB processing over multiple slots scheduled by DCI format 0_1 or 0_2, based on tdd-UL-DL-Configuration-Common, tdd-UL-DL-ConfigurationDedicated, uplink (UL) and downlink (DL) subband configuration and ssb-PositionsInBurst, and the TDRA information field value in the DCI format 0_1 or 0_2. tdd-UL-DL-ConfigurationCommon provides the UE 115 with cell-specific slot format configuration, tdd-UL-DL-ConfigurationDedicated provides the UE 115 with dedicated slot format configuration, and UL and DL subband configuration provides the UE 115 with a pattern for uplink and downlink subband allocation. tdd-UL-DL-ConfigurationCommon, tdd-UL-DL-Configuration-Dedicated, uplink (UL) and downlink (DL) subband configuration may be provided via DCI for dynamic slot configuration and may be provided by RRC for static and semi-static configuration. ssb-PositionsInBurst informs the UE 115 which synchronization signal blocks (SSBs) and thereby the time domain positions of the SSBs are being transmitted. A slot may not be counted in the number of slots for a PUSCH transmission of TB processing over multiple slots if at least one of the symbols indicated by the indexed row of the used resource allocation table in the slot overlaps with a downlink symbol indicated by tdd-UL-DL-Configuration-Common or tdd-UL-DL ConfigurationDedicated if provided without a configured uplink subband, or a symbol of an SS/PBCH block (SSB) with index provided by ssb-PositionsInBurst.

For the second case, the UE 115 may determine slots (NK) for a PUSCH transmission of TB processing over multiple slots scheduled by DCI format 0_1 or 0_2, based on tdd-UL-DL-ConfigurationCommon, tdd-UL-DL-Configuration-tionDedicated, UL and DL subband configuration and ssb-PositionsInBurst, and the TDRA and FDRA information fields value in the DCI format 0_1 or 0_2. A slot may not be counted in the number of NK slots for a PUSCH transmission of TB processing over multiple slots if at least one of the symbols indicated by the indexed row of the used resource allocation table in the slot overlaps with a DL symbol indicated by tdd-UL-DL-ConfigurationCommon or tdd-UL-DL ConfigurationDedicated if provided without a configured UL subband, or a symbol of an SS/PBCH block with index provided by ssb-PositionsInBurst. A slot may not be counted in the number of NK slots for PUSCH transmission of a of TB processing over multiple slots scheduled by DCI format 0_1 or 0_2 if at least one of the PRBs indicated by the FDRA bitfield within the UE active UL BWP is outside the UL subband.

For the first case, a slot is available if time and frequency resources are available, thus providing a uniform number of PRBs in each slot of the TBoMS. TBoMS may be restricted to slots of similar type, such as only uplink slots or only downlink slots with uplink resources (e.g., uplink subband). In one example of the slot selection scheme, the UE 115 identifies a set of uplink slots (e.g., uplink slot 420-*a* and uplink slot 420-*b* where the DCI indicates the TBoMS is over two slots) from the set of candidate slots that that are first available in time. In another example of the slot selection scheme, the UE 115 identifies a set of downlink slots with uplink subband (e.g., downlink slot 425-*a* and downlink slot 425-*b* where the DCI indicates the TBoMS is over two slots) from the set of candidate slots that that are first available in time.

For the second case, a slot is available if the time resources are available, thus possibly providing a varying number of PRBs across different slots of the TBoMS. PRBs may be different between uplink slots (e.g., uplink slot 420-*a* and uplink slot 420-*b*) and downlink slots with uplink resources (e.g., downlink slot 425-*a* and downlink slot 425-*b*). In one example of the slot selection scheme, the UE 115 may identify a set of slots from the set of candidate slots that that are first available in time. The set of slots may include at least one uplink slot 420-*a* and at least one downlink slot 425-*a* with uplink subband 430-*a*.

In some examples, to determine the TB size for a PUSCH, the UE 115 may determine a number of RES, $$(N'_{RE}),$$

allocated for the PUSCH within a PRB as $$N'_{RE} = N^{RB}_{sc} \cdot N^{sh}_{symb} - N^{PRB}_{DMRS} - N^{PRB}_{oh} \cdot N'_{RE}$$

may be a function of the number of symbols, $$(N^{sh}_{symb}),$$

and number of resource blocks (RBs), $$(N^{RB}_{sc}),$$

allocated to PUSCH, the number of resources assigned for DMRS $$(N^{PRB}_{DMRS})$$

and an additional overhead factor $$\left(N_{oh}^{PRB}\right).$$

The UE 115 may then determine a total number of REs allocated to PUSCH as $$N_{RE} = n_{prb} * \min(156, N'_{RE}),$$

where $n_{prb}$ denotes the total number of PRBs assigned to the UE 115. The UE 115 may then determine an intermediate number of information bits $N_{info}$ as $N_{info}=N_{RE}*R*Q_m*V$, where R is the coding rate, $Q_m$ is the modulation order and v is the number of layers. Once the intermediate number of information bits is obtained, if $N_{info} \leq 3824$ the TB size may be based on a formula or else, a formula-based approach may be used to compute the TB size.

In some examples, to determine the TB size of TBoMS, the UE 115 may determine a number of RES, $$\left(N'_{RE}\right),$$

allocated for the PUSCH within a PRB as $$N'_{RE} = N_{sc}^{RB} \cdot N_{symb}^{sh} - N_{DMRS}^{PRB} - N_{oh}^{PRB} \cdot N'_{RE}$$

may be a function of the number of symbols, $$\left(N_{symb}^{sh}\right),$$

and number of resource blocks (RBs), $$\left(N_{sc}^{RB}\right),$$

allocated to PUSCH, the number of resources assigned for DMRS $$\left(N_{DMRS}^{PRB}\right)$$

and an additional overhead factor $$\left(N_{oh}^{PRB}\right).$$

The UE 115 may then determine a total number of REs allocated to PUSCH as $$N_{RE} = n_{prb} * \min(156, N'_{RE}),$$

where $n_{prb}$ denotes the total number of PRBs assigned to the UE 115. The UE 115 may then determine an intermediate number of information bits $N_{info}$ as $N_{info}=N_{RE}*R*Q_m*V$, where R is the coding rate, $Q_m$ is the modulation order, v is the number of layers, and N is the number TBoMS slots. Once the intermediate number of information bits is obtained, if $N_{info} \leq 3824$ the TB size may be based on a formula or else, a formula-based approach may be used to compute the TB size.

In some examples, the UE 115 may determine the number of RES $N_{RE}$ separately for uplink slots (e.g., uplink slot 420-*a* and uplink slot 420-*b*) and downlink slots (e.g., downlink slot 425-*a* and downlink slot 425-*b*) with uplink resources (e.g., uplink subband 430-*a* and uplink subband 430-*b*). That is, the UE 115 may determine a first quantity of REs available for transmission of information bits in each uplink slot and second quantity of REs available for transmission of information bits in each downlink slot configured with the uplink subband. For example, the UE 115 may determine the number of REs for uplink slots, ($N_{RE-uplink}$), based on the number of PRBs for the uplink slots, ($n_{prb-uplink}$). The number of REs for the uplink slots may be the same as the allocation indicated by the FDRA in either DCI for dynamic grants or configured by RRC for configured grants. The UE 115 may determine the number of REs for downlink slots with uplink resources ($N_{RE-dl-ulsb}$) based on the number of PRBs for the downlink slots with uplink resources ($n_{prb-dl-ulsb}$). The number of REs for the downlink slots with uplink resources may be determined as the intersection of resources indicated by the FRDRA and the resources associated with the uplink subband. The number of REs for the downlink slots with uplink resources may be less than the resources indicated by the FDRA.

In some examples, the UE 115 may determine the TB size using the number of REs for uplink slots ($N_{RE-uplink}$) and the number of REs for downlink slots with uplink resources ($N_{RE-dl-ulsb}$). For example, the UE 115 may determine a number of REs allocated to PUSCH ($N_{RE}$) as $$N_{RE-uplink} = n_{prb-uplink} * \min(156, N'_{RE})$$

where $n_{prb-uplink}$ denotes the total number of PRBs assigned to the uplink slot and $$N_{RE-dl-ulsb} = n_{prb-dl-ulsb} * \min(156, N'_{RE}),$$

where $n_{prb-dl-ulsb}$ denotes the total number of PRBs assigned to the uplink subband of the downlink slot. The UE 115 then determines the intermediate number of information bits $N_{info}$ as $N_{info}=(N_1*N_{RE-uplink}+N_2*N_{RE-dl-ulcb})*R*Q_m*v$, where R is the coding rate, $Q_m$ is the modulation order and v is the number of layers, $N_1$ is the number uplink slots for TBoMS and $N_2$ is the number of downlink slots with uplink resources used for TBoMS. Once the intermediate number of information bits is obtained, if $N_{info \leq 3824}$ the TB size may be based on a formula or else, a formula-based approach may be used to compute the TB size.

In some examples, the number uplink slots (e.g., uplink slot 420-*a* and uplink slot 420-*b*) for TBoMS ($N_1$) and the number of downlink slots (e.g., downlink slot 425-*a* and downlink slot 425-*b*) with uplink resources used for TBoMS ($N_2$) may be based on available slot counting. For example, the UE 115 may identify a set of slots from the set of candidate slots that are first available in time, and the set of slots comprising at least one uplink slot 420-*a* and at least one downlink slot 425-*a* configured with the uplink subband 430-*a*.

In some examples, the number of PRBs for the uplink slots ($n_{prb\text{-}uplink}$) may be determined based on FDRA allocation provided in the dynamic or configured grant, and the number of PRBs for the downlink slots with uplink resources ($n_{prb\text{-}dl\text{-}ulsb}$) may be determined based on an overlap 435 between the FDRA 405 in the grant and the resources for the uplink subband 430-*a* and uplink subband 430-*b*.

In another example, irrespective of the types of slots used for TBoMS, the UE 115 may determine the total number of PRBs ($n_{prb}$) based on the FDRA provided in the dynamic or configured grant (e.g., the UE 115 assumes each slot includes the entire FDRA even if an included downlink slot configured with uplink resources includes less uplink frequency resources than the indicated FDRA).

In another example, irrespective of the types of slots used for TBoMS, the UE 115 may determine the total number of PRBs ($n_{prb}$) based on the minimum resources available in the uplink slots (e.g., uplink slot 420-*a* and uplink slot 420-*b*) or the downlink slots (e.g., downlink slot 425-*a* and downlink slot 425-*b*) with uplink resources. For example, $n_{prb}=\min(n_{prb\text{-}uplink}, n_{prb\text{-}dl\text{-}ulsb})$, and $$N_{RE} = n_{prb} * \min(156, N'_{RE}),$$

and $N_{info}=N*N_{RE}*R*Q_m*v$. In some examples, the UE 115 may determine the quantity of information bits (TB size) based on a determination of a quantity of REs available for transmission of information bits in each slot of the set of candidate slots based at least in part on a minimum overlap between the FDRA and the frequency resources of the uplink subband.

Figure 5:
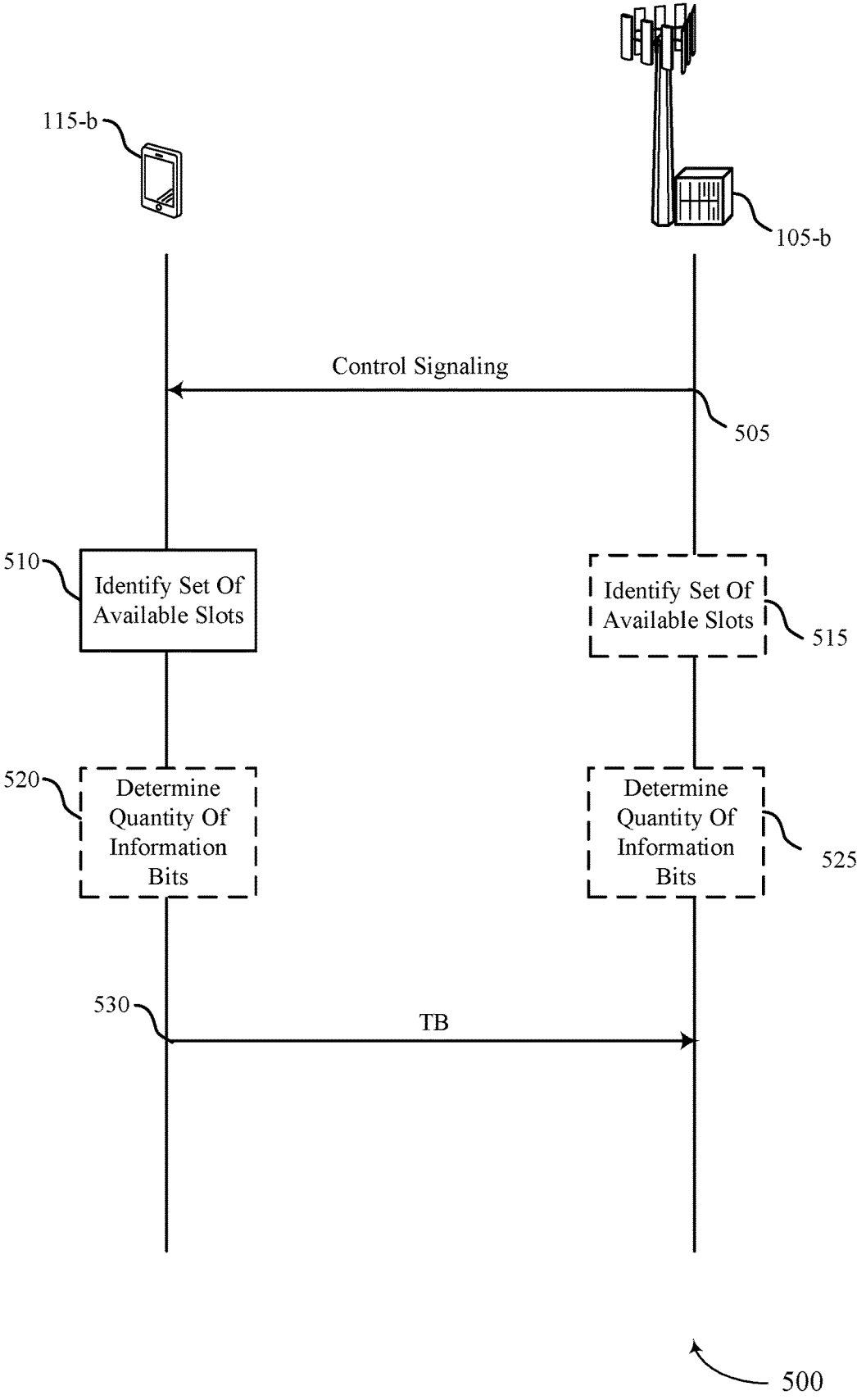
FIG. 5 shows an example of a process flow that supports TBoMS with SBFD operation in accordance with one or more aspects of the present disclosure.

FIG. 5 shows an example of a process flow 500 that supports TBoMS with SBFD operation in accordance with one or more aspects of the present disclosure. In some examples, the process flow 500 may implement or be implemented by aspects of the wireless communications system 100 or the wireless communications system 200 as described with reference to FIGS. 1 and 2, respectively. For example, the process flow 500 may be implemented by a network entity 105*b* and a UE 115*b*, which may be examples of a network entity 105 and a UE 115 as described with reference to FIGS. 1 and 2. The process flow 500 may be implemented by the network entity 105*b* and the UE 115*b* to exchange signaling to promote power saving at the UE 115*b* and reliable communications between the network entity 105*b* and the UE 115*b*. In the following description of the process flow 500, the operations between the network entity 105*b* and the UE 115*b* may be transmitted in a different order than the example order shown, or the operations performed by the network entity 105*b* and the UE 115*b* may be performed in different orders or at different times. Some operations may also be omitted from the process flow 500, and other operations may be added to the process flow.

At 505, the network entity 105-*b* may transmit and the UE 115-*b* may receive control signaling including indicating a resource allocation for a transmission of a TB across multiple slots. The resource allocation may include an FDRA indicative of a first set of frequency resources and a TDRA indicative of a set of candidate slots for the transmission of the TB. The set of candidate slots may include one or more uplink slots and one or more downlink slots configured with an uplink subband. The uplink subband may include a second set of frequency resources, and the control signaling may indicate a quantity of slots for the transmission of the TB.

In some examples, the network entity 105-*b* may transmit and the UE 115-*b* may receive a downlink control information indicating the resource allocation. In some examples, the set of candidate slots may include slots scheduled after a duration after reception of the control signaling.

At 510, the UE 115-*b* may identify a set of available slots from the set of candidate slots in accordance with a slot selection scheme. A quantity of slots of the set of available slots may be equal to the quantity of slots for the transmission of the TB.

At 515, the network entity 105-*b* may correspondingly identify set of available slots from the set of candidate slots in accordance with a slot selection scheme. A quantity of slots of the set of available slots may be equal to the quantity of slots for the transmission of the TB.

In some examples, the UE 115-*b* and/or the network entity 105-*b* may identify a set of uplink slots from the set of candidate slots that are first available in time, where the set of available slots may be the set of uplink slots, and where the quantity of information bits may be is based on the set of available slots being uplink slots.

In some examples, the UE 115-*b* and/or the network entity 105-*b* may identify a set of downlink slots configured with the uplink subband from the set of candidate slots that are first available in time, where the set of available slots is the set of downlink slots configured with the uplink subband. In some examples, the quantity of information bits may be based on the uplink subband including the second set of frequency resources.

At 520, optionally, the UE 115-*b* may determine a quantity of information bits included in the TB (e.g., the TB size) based on a first quantity of uplink slots included in the set of candidate slots and a second quantity of downlink slots configured with the uplink subband included in the set of candidate slots. In some examples, the UE 115-*b* and/or the network entity 105-*b* may determine, based on the first set of frequency resources, a first quantity of REs available for transmission of information bits in each uplink slot, and the UE 115-*b* and/or the network entity 105-*b* may determine, based on an overlap between the first set of frequency resources and the second set of frequency resources, a second quantity of REs available for transmission of information bits in each downlink slot configured with the uplink subband.

At 525, optionally, the network entity 105-*b* may correspondingly determine the quantity of information bits included in the TB based on a first quantity of uplink slots included in the set of candidate slots and a second quantity of downlink slots configured with the uplink subband included in the set of candidate slots. In some examples, the network entity 105-*b* may determine, based on the first set of frequency resources, a first quantity of REs available for transmission of information bits in each uplink slot, and the network entity 105-*b* may determine, based on an overlap between the first set of frequency resources and the second set of frequency resources, a second quantity of REs available for transmission of information bits in each downlink slot configured with the uplink subband.

In some examples, the UE 115-*b* and/or the network entity 105-*b* may determine the quantity of information bits based on a determination of a quantity of REs available for transmission of information bits in each slot of the set of candidate slots based on the first set of frequency resources, where the set of available slots may include at least one uplink slot and at least one downlink slot configured with the uplink subband. In some examples, the UE 115-b and/or the network entity 105-b may determine the quantity of information bits based on a determination of a quantity of REs available for transmission of information bits in each slot of the set of candidate slots based on a minimum overlap between the first set of frequency resources and the second set of frequency resources, where the set of available slots may include at least one uplink slot and at least one downlink slot configured with the uplink subband.

At 530, the UE 115-b may transmit, and the network entity 105-b may receive, the TB over the set of available slots, where the quantity of information bits included in the TB is based on the set of available slots.

Figure 6:
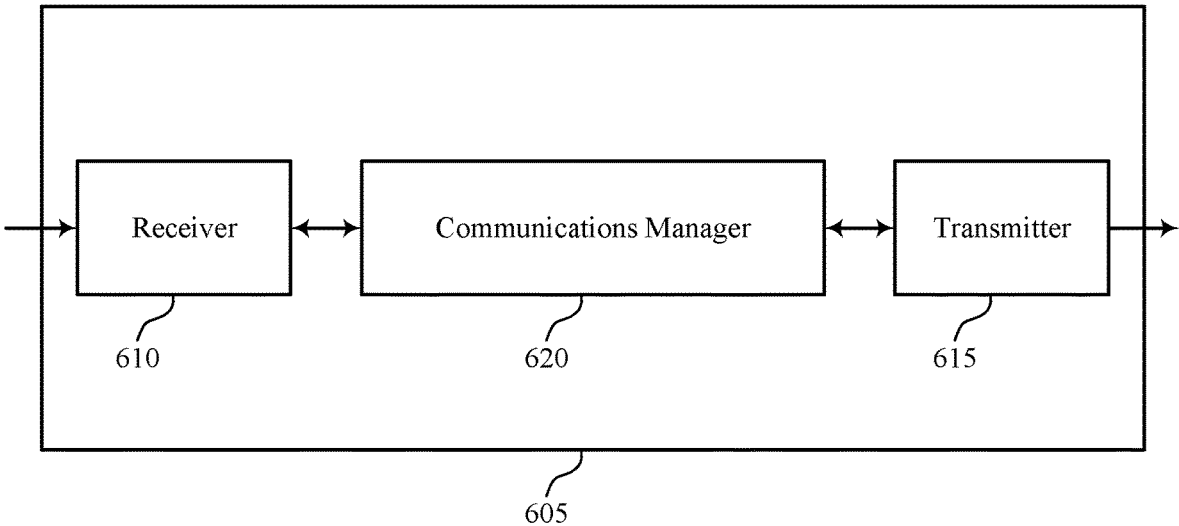
FIGS. 6 and 7 show block diagrams of devices that support TBoMS with SBFD operation in accordance with one or more aspects of the present disclosure.

FIG. 6 shows a block diagram 600 of a device 605 that supports TBoMS with SBFD operation in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to TBoMS with SBFD operation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to TBoMS with SBFD operation). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of TBoMS with SBFD operation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 is capable of, configured to, or operable to support a means for receiving control signaling indicating a resource allocation for a transmission of a TB across multiple slots, where the resource allocation includes an FDRA indicative of a first set of frequency resources and a TDRA indicative of a set of candidate slots for the transmission of the TB, where the set of candidate slots includes one or more uplink slots and one or more downlink slots configured with an uplink subband where the uplink subband includes a second set of frequency resources, and where the control signaling indicates a quantity of slots for the transmission of the TB. The communications manager 620 is capable of, configured to, or operable to support a means for identifying a set of available slots from the set of candidate slots in accordance with a slot selection scheme, where a quantity of slots of the set of available slots is equal to the quantity of slots for the transmission of the TB. The communications manager 620 is capable of, configured to, or operable to support a means for transmitting the TB over the set of available slots, where a quantity of information bits included in the TB is based on the set of available slots.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing and more efficient utilization of communication resources.

Figure 7:
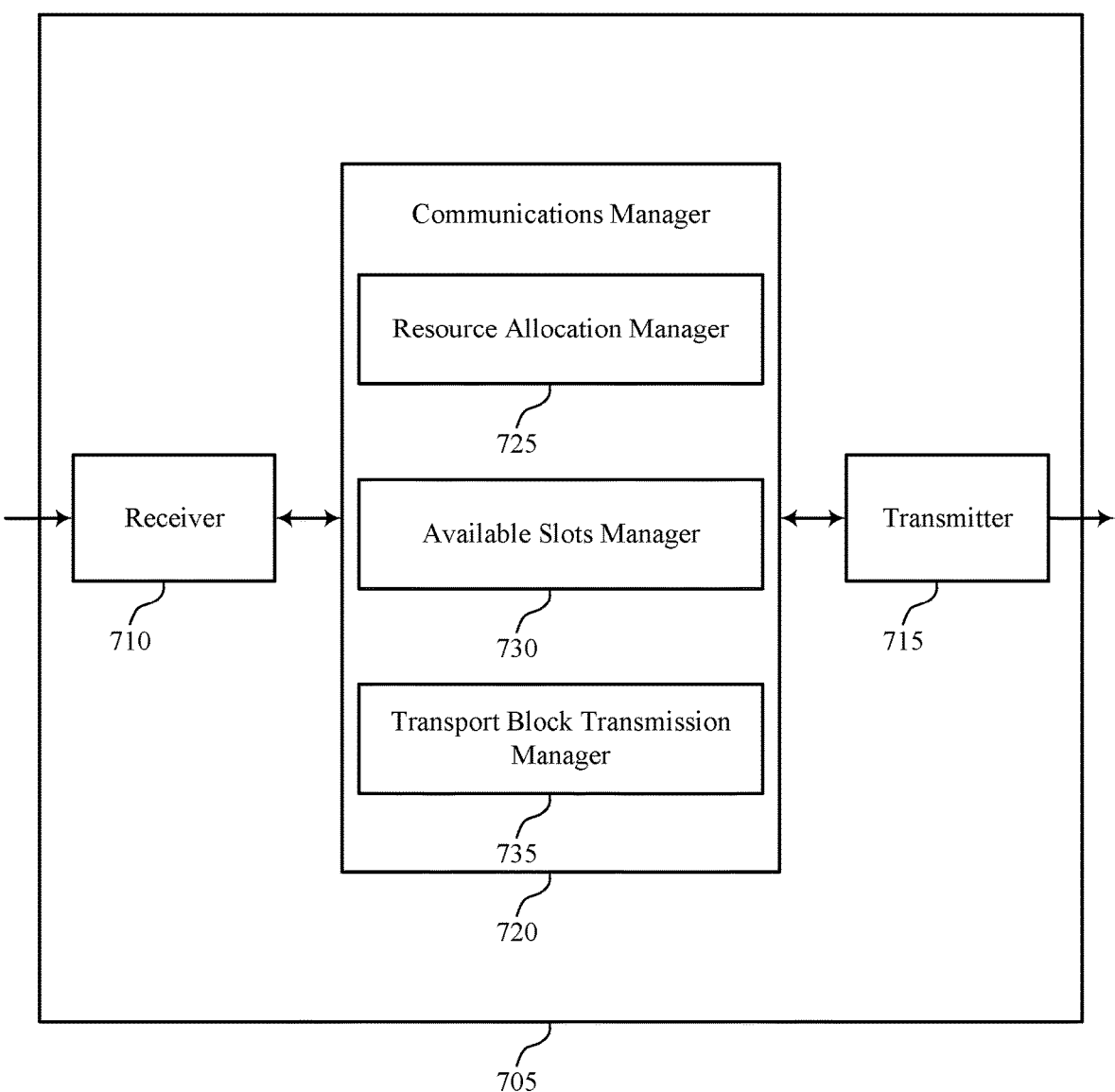

FIG. 7 shows a block diagram 700 of a device 705 that supports TBoMS with SBFD operation in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to TBoMS with SBFD operation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to TBoMS with SBFD operation). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of TBoMS with SBFD operation as described herein. For example, the communications manager 720 may include a resource allocation manager 725, an available slots manager 730, a TB transmission manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The resource allocation manager 725 is capable of, configured to, or operable to support a means for receiving control signaling indicating a resource allocation for a transmission of a TB across multiple slots, where the resource allocation includes an FDRA indicative of a first set of frequency resources and a TDRA indicative of a set of candidate slots for the transmission of the TB, where the set of candidate slots includes one or more uplink slots and one or more downlink slots configured with an uplink subband where the uplink subband includes a second set of frequency resources, and where the control signaling indicates a quantity of slots for the transmission of the TB. The available slots manager 730 is capable of, configured to, or operable to support a means for identifying a set of available slots from the set of candidate slots in accordance with a slot selection scheme, where a quantity of slots of the set of available slots is equal to the quantity of slots for the transmission of the TB. The TB transmission manager 735 is capable of, configured to, or operable to support a means for transmitting the TB over the set of available slots, where a quantity of information bits included in the TB is based on the set of available slots.

Figure 8:
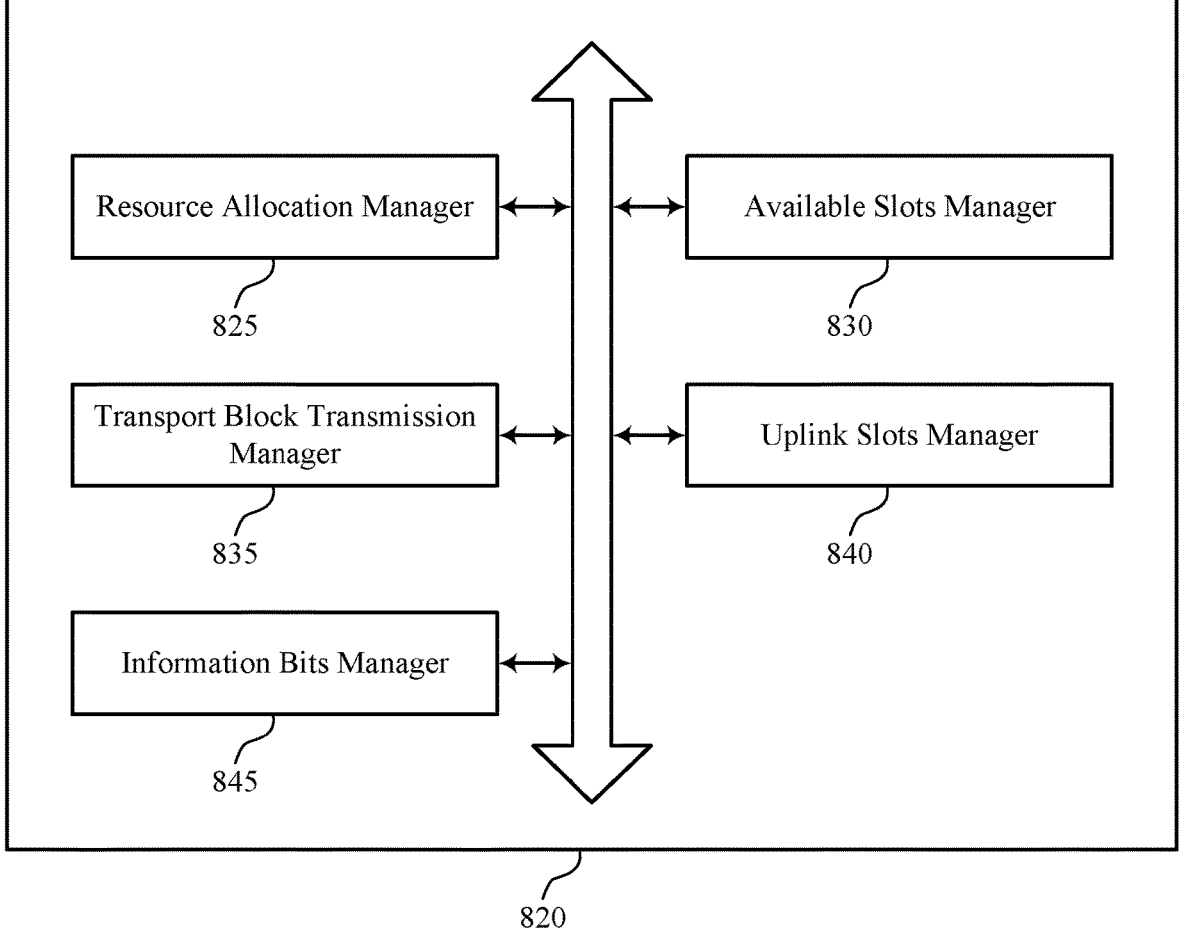
FIG. 8 shows a block diagram of a communications manager that supports TBoMS with SBFD operation in accordance with one or more aspects of the present disclosure.

FIG. 8 shows a block diagram 800 of a communications manager 820 that supports TBoMS with SBFD operation in accordance with one or more aspects of the present disclosure. The communications manager 820 may be an example of aspects of a communications manager 620, a communications manager 720, or both, as described herein. The communications manager 820, or various components thereof, may be an example of means for performing various aspects of TBoMS with SBFD operation as described herein. For example, the communications manager 820 may include a resource allocation manager 825, an available slots manager 830, a TB transmission manager 835, an uplink slots manager 840, an information bits manager 845, or any combination thereof. Each of these components may communicate, directly or indirectly, with one another (e.g., via one or more buses).

The communications manager 820 may support wireless communications at a UE in accordance with examples as disclosed herein. The resource allocation manager 825 is capable of, configured to, or operable to support a means for receiving control signaling indicating a resource allocation for a transmission of a TB across multiple slots, where the resource allocation includes an FDRA indicative of a first set of frequency resources and a TDRA indicative of a set of candidate slots for the transmission of the TB, where the set of candidate slots includes one or more uplink slots and one or more downlink slots configured with an uplink subband where the uplink subband includes a second set of frequency resources, and where the control signaling indicates a quantity of slots for the transmission of the TB. The available slots manager 830 is capable of, configured to, or operable to support a means for identifying a set of available slots from the set of candidate slots in accordance with a slot selection scheme, where a quantity of slots of the set of available slots is equal to the quantity of slots for the transmission of the TB. The TB transmission manager 835 is capable of, configured to, or operable to support a means for transmitting the TB over the set of available slots, where a quantity of information bits included in the TB is based on the set of available slots.

In some examples, to support identifying the set of available slots from the set of candidate slots in accordance with the slot selection scheme, the uplink slots manager 840 is capable of, configured to, or operable to support a means for identifying a set of uplink slots from the set of candidate slots that are first available in time, where the set of available slots is the set of uplink slots, and where the quantity of information bits is based on the set of available slots being uplink slots.

In some examples, the information bits manager 845 is capable of, configured to, or operable to support a means for determining the quantity of information bits based on a first quantity of uplink slots included in the set of candidate slots and a second quantity of downlink slots configured with the uplink subband included in the set of candidate slots.

In some examples, to support determining the quantity of information bits, the information bits manager 845 is capable of, configured to, or operable to support a means for determining, based on the first set of frequency resources, a first quantity of REs available for transmission of information bits in each uplink slot. In some examples, to support determining the quantity of information bits, the information bits manager 845 is capable of, configured to, or operable to support a means for determining, based on an overlap between the first set of frequency resources and the second set of frequency resources, a second quantity of REs available for transmission of information bits in each downlink slot configured with the uplink subband.

In some examples, the information bits manager 845 is capable of, configured to, or operable to support a means for determining the quantity of information bits based on a determination of a quantity of REs available for transmission of information bits in each slot of the set of candidate slots based on the first set of frequency resources, where the set of available slots includes at least one uplink slot and at least one downlink slot configured with the uplink subband.

In some examples, the uplink slots manager 840 is capable of, configured to, or operable to support a means for determining the quantity of information bits based on a determination of a quantity of REs available for transmission of information bits in each slot of the set of candidate slots based on a minimum between the first set of frequency resources and the second set of frequency resources, where the set of available slots includes at least one uplink slot and at least one downlink slot configured with the uplink subband.

In some examples, to support identifying the set of available slots from the set of candidate slots in accordance with the slot selection scheme, the available slots manager 830 is capable of, configured to, or operable to support a means for identifying a set of slots from the set of candidate slots that are first available in time, the set of slots including at least one uplink slot and at least one downlink slot configured with the uplink subband.

In some examples, to support identifying the set of available slots from the set of candidate slots in accordance with the slot selection scheme, the available slots manager 830 is capable of, configured to, or operable to support a means for identifying a set of downlink slots configured with the uplink subband from the set of candidate slots that are first available in time, where the set of available slots is the set of downlink slots configured with the uplink subband.

In some examples, the quantity of information bits is based on the uplink subband including the second set of frequency resources.

In some examples, to support receiving the control signaling, the resource allocation manager 825 is capable of, configured to, or operable to support a means for receiving a downlink control information indicating the resource allocation.

In some examples, the candidate set of slots include slots scheduled after a duration after reception of the control signaling.

Figure 9:
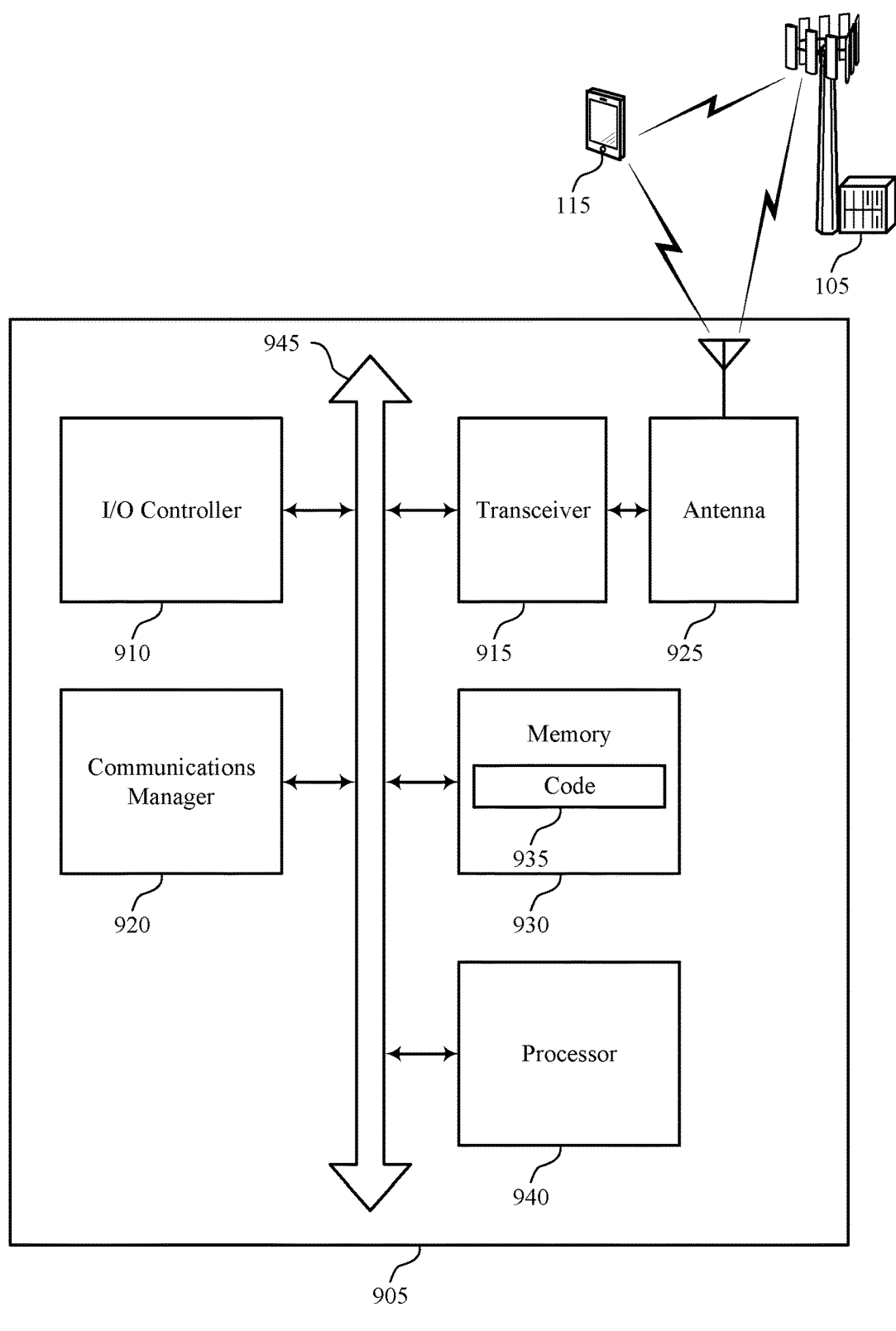
FIG. 9 shows a diagram of a system including a device that supports TBoMS with SBFD operation in accordance with one or more aspects of the present disclosure.

FIG. 9 shows a diagram of a system 900 including a device 905 that supports TBoMS with SBFD operation in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting TBoMS with SBFD operation). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 is capable of, configured to, or operable to support a means for receiving control signaling indicating a resource allocation for a transmission of a TB across multiple slots, where the resource allocation includes an FDRA indicative of a first set of frequency resources and a TDRA indicative of a set of candidate slots for the transmission of the TB, where the set of candidate slots includes one or more uplink slots and one or more downlink slots configured with an uplink subband where the uplink subband includes a second set of frequency resources, and where the control signaling indicates a quantity of slots for the transmission of the TB. The communications manager 920 is capable of, configured to, or operable to support a means for identifying a set of available slots from the set of candidate slots in accordance with a slot selection scheme, where a quantity of slots of the set of available slots is equal to the quantity of slots for the transmission of the TB. The communications manager 920 is capable of, configured to, or operable to support a means for transmitting the TB over the set of available slots, where a quantity of information bits included in the TB is based on the set of available slots.

By including or configuring the communications manager 920 in accordance with examples as described herein, the device 905 may support techniques for improved communication reliability, reduced latency, more efficient utilization of communication resources, improved coordination between devices, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of TBoMS with SBFD operation as described herein, or the processor 940 and the memory 930 may be otherwise configured to perform or support such operations.

Figure 10:
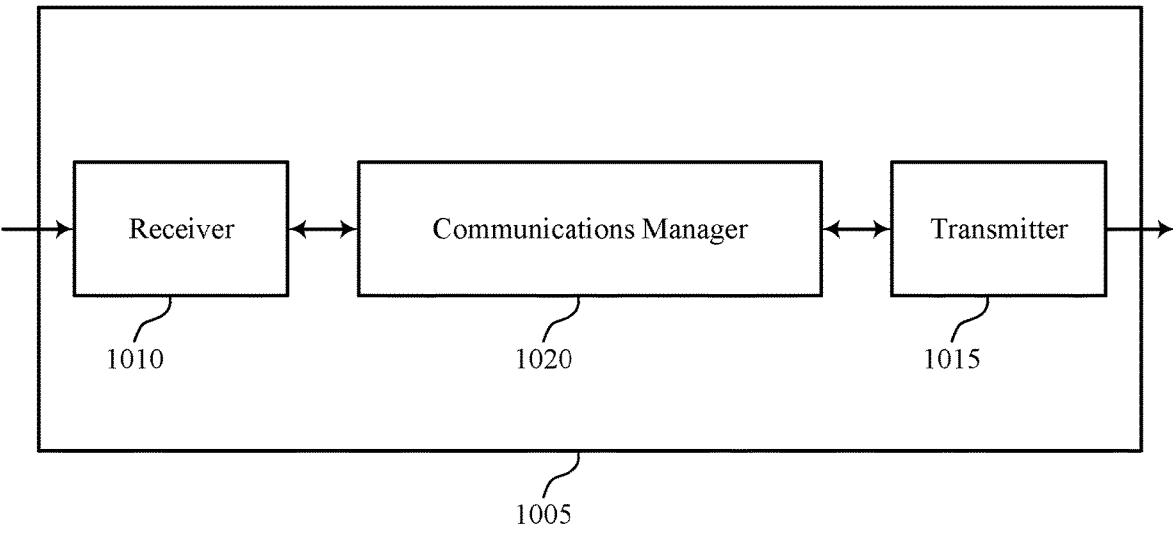
FIGS. 10 and 11 show block diagrams of devices that support TBoMS with SBFD operation in accordance with one or more aspects of the present disclosure.

FIG. 10 shows a block diagram 1000 of a device 1005 that supports TBoMS with SBFD operation in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support transmitting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of TBoMS with SBFD operation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 is capable of, configured to, or operable to support a means for transmitting, to a UE, control signaling indicating a resource allocation for a transmission of a TB across multiple slots by the UE, where the resource allocation includes an FDRA indicative of a first set of frequency resources and a TDRA indicative of a set of candidate slots for the transmission of the TB, where the set of candidate slots includes one or more uplink slots and one or more downlink slots configured with an uplink subband, where the uplink subband includes a second set of frequency resources, and where the control signaling indicates a quantity of slots for the transmission of the TB. The communications manager 1020 is capable of, configured to, or operable to support a means for identifying a set of available slots from the set of candidate slots in accordance with a slot selection scheme, where a quantity of slots of the set of available slots is equal to the quantity of slots for the transmission of the TB. The communications manager 1020 is capable of, configured to, or operable to support a means for receiving, from the UE, the TB over the set of available slots, where a quantity of information bits included in the TB is based on the set of available slots.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing and more efficient utilization of communication resources.

Figure 11:
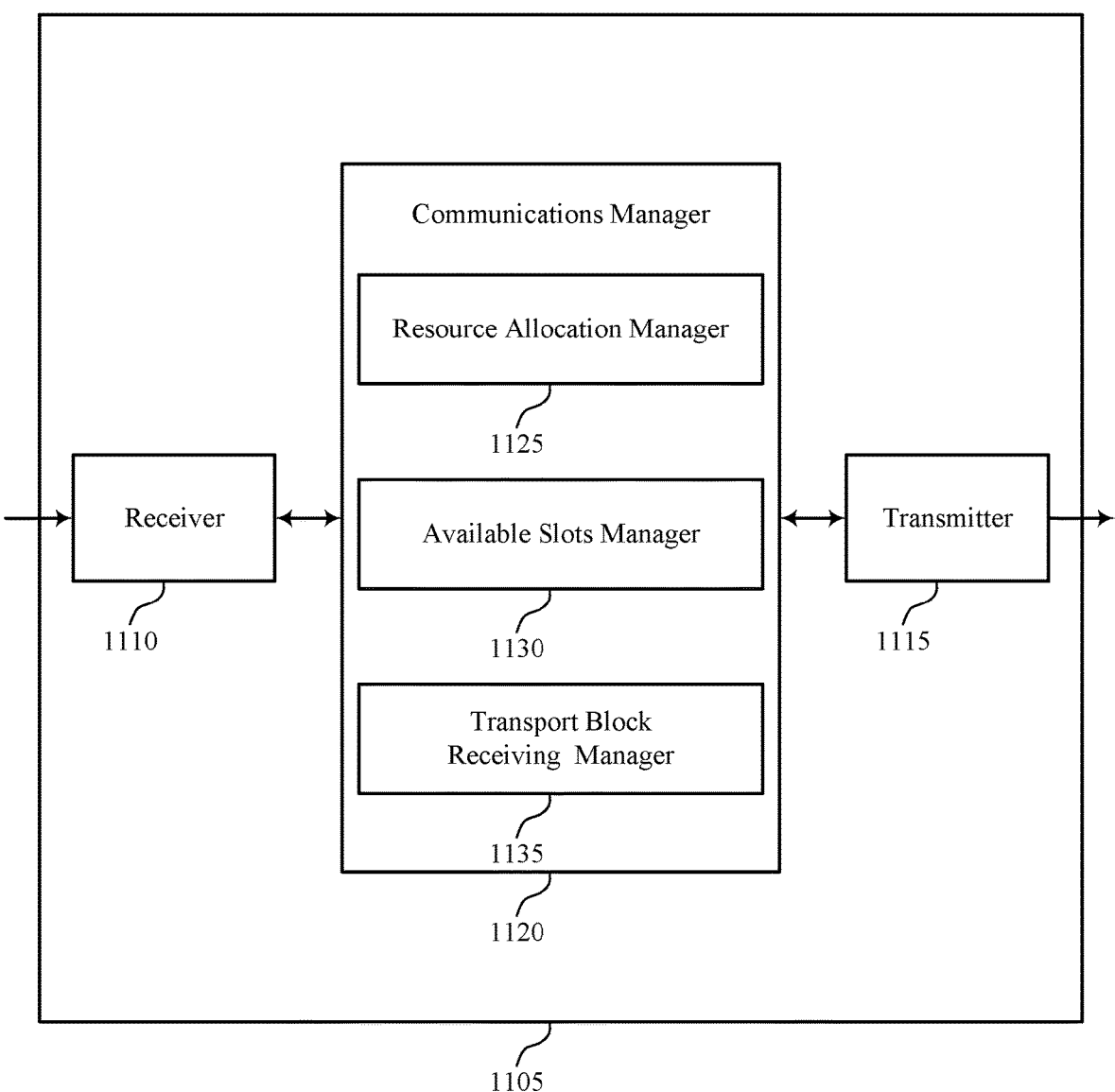

FIG. 11 shows a block diagram 1100 of a device 1105 that supports TBoMS with SBFD operation in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas.

Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of TBoMS with SBFD operation as described herein. For example, the communications manager 1120 may include a resource allocation manager 1125, an available slots manager 1130, a TB receiving manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The resource allocation manager 1125 is capable of, configured to, or operable to support a means for transmitting, to a UE, control signaling indicating a resource allocation for a transmission of a TB across multiple slots by the UE, where the resource allocation includes an FDRA indicative of a first set of frequency resources and a TDRA indicative of a set of candidate slots for the transmission of the TB, where the set of candidate slots includes one or more uplink slots and one or more downlink slots configured with an uplink subband, where the uplink subband includes a second set of frequency resources, and where the control signaling indicates a quantity of slots for the transmission of the TB. The available slots manager 1130 is capable of, configured to, or operable to support a means for identifying a set of available slots from the set of candidate slots in accordance with a slot selection scheme, where a quantity of slots of the set of available slots is equal to the quantity of slots for the transmission of the TB. The TB receiving manager 1135 is capable of, configured to, or operable to support a means for receiving, from the UE, the TB over the set of available slots, where a quantity of information bits included in the TB is based on the set of available slots.

Figure 12:
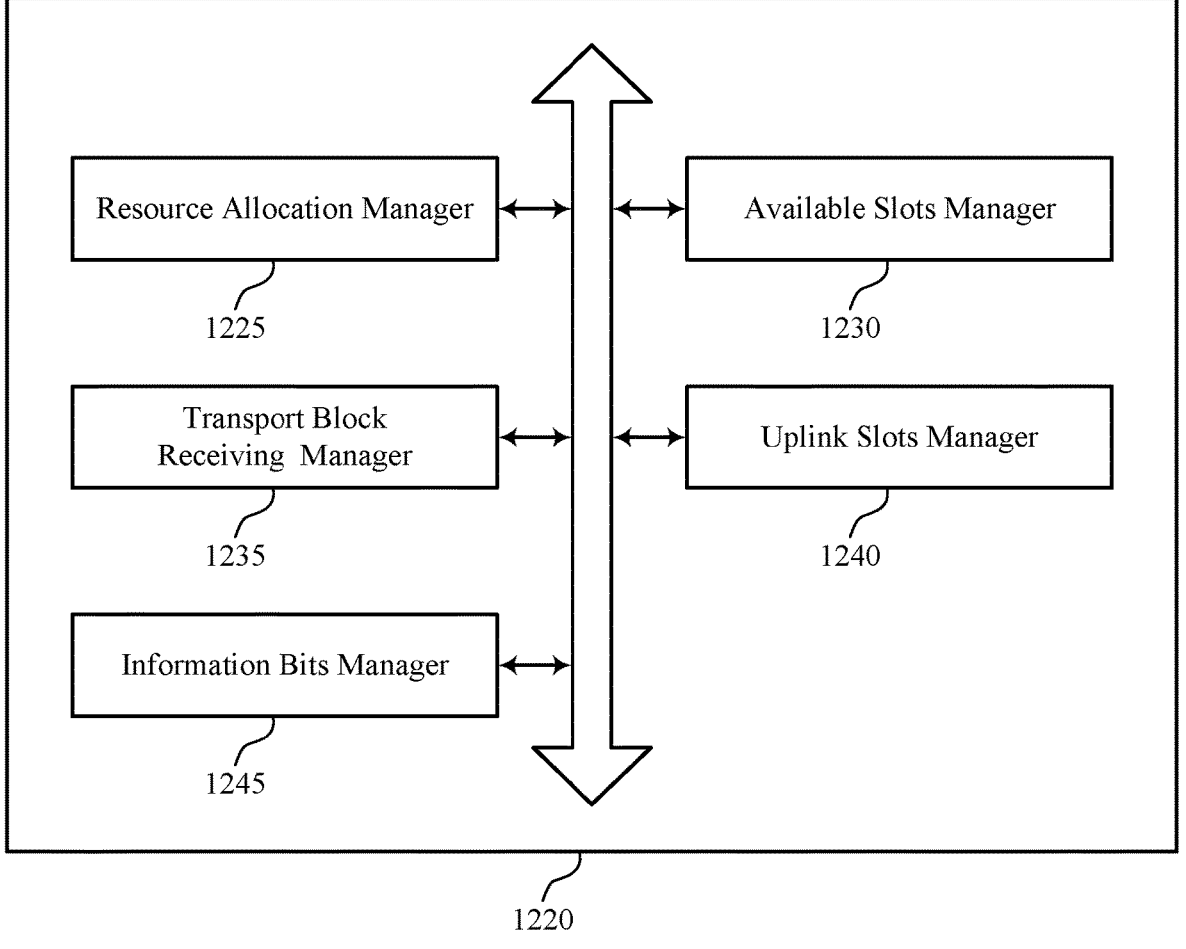
FIG. 12 shows a block diagram of a communications manager that supports TBoMS with SBFD operation in accordance with one or more aspects of the present disclosure.

FIG. 12 shows a block diagram 1200 of a communications manager 1220 that supports TBoMS with SBFD operation in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of TBoMS with SBFD operation as described herein. For example, the communications manager 1220 may include a resource allocation manager 1225, an available slots manager 1230, a TB receiving manager 1235, an uplink slots manager 1240, an information bits manager 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The resource allocation manager 1225 is capable of, configured to, or operable to support a means for transmitting, to a UE, control signaling indicating a resource allocation for a transmission of a TB across multiple slots by the UE, where the resource allocation includes an FDRA indicative of a first set of frequency resources and a TDRA indicative of a set of candidate slots for the transmission of the TB, where the set of candidate slots includes one or more uplink slots and one or more downlink slots configured with an uplink subband, where the uplink subband includes a second set of frequency resources, and where the control signaling indicates a quantity of slots for the transmission of the TB. The available slots manager 1230 is capable of, configured to, or operable to support a means for identifying a set of available slots from the set of candidate slots in accordance with a slot selection scheme, where a quantity of slots of the set of available slots is equal to the quantity of slots for the transmission of the TB. The TB receiving manager 1235 is capable of, configured to, or operable to support a means for receiving, from the UE, the TB over the set of available slots, where a quantity of information bits included in the TB is based on the set of available slots.

In some examples, to support identifying the set of available slots from the set of candidate slots in accordance with the slot selection scheme, the uplink slots manager 1240 is capable of, configured to, or operable to support a means for identifying a set of uplink slots from the set of candidate slots that are first available in time, where the set of available slots is the set of uplink slots, and where the quantity of information bits is based on the set of available slots being uplink slots.

In some examples, the uplink slots manager 1240 is capable of, configured to, or operable to support a means for determining the quantity of information bits based on a first quantity of uplink slots included in the set of candidate slots and a second quantity of downlink slots configured with the uplink subband included in the set of candidate slots.

In some examples, the information bits manager 1245 is capable of, configured to, or operable to support a means for determining, based on the first set of frequency resources, a first quantity of REs available for transmission of information bits in each uplink slot. In some examples, the information bits manager 1245 is capable of, configured to, or operable to support a means for determining, based on an overlap between the first set of frequency resources and the second set of frequency resources, a second quantity of REs available for transmission of information bits in each downlink slot configured with the uplink subband.

In some examples, the information bits manager 1245 is capable of, configured to, or operable to support a means for determining the quantity of information bits based on a determination of a quantity of REs available for transmission of information bits in each slot of the set of candidate slots based on the first set of frequency resources, where the set of available slots includes at least one uplink slot and at least one downlink slot configured with the uplink subband.

In some examples, the information bits manager 1245 is capable of, configured to, or operable to support a means for determining the quantity of information bits based on a determination of a quantity of REs available for transmission of information bits in each slot of the set of candidate slots based on a minimum between the first set of frequency resources and the second set of frequency resources, where the set of available slots includes at least one uplink slot and at least one downlink slot configured with the uplink subband.

In some examples, to support identifying the set of available slots from the set of candidate slots in accordance with the slot selection scheme, the available slots manager 1230 is capable of, configured to, or operable to support a means for identifying a set of slots from the set of candidate slots that are first available in time, the set of slots including at least one uplink slot and at least one downlink slot configured with the uplink subband.

In some examples, to support identifying the set of available slots from the set of candidate slots in accordance with the slot selection scheme, the available slots manager 1230 is capable of, configured to, or operable to support a means for identifying a set of downlink slots configured with the uplink subband from the set of candidate slots that are first available in time, where the set of available slots is the set of downlink slots configured with the uplink subband.

In some examples, the quantity of information bits is based on the uplink subband including the second set of frequency resources.

In some examples, to support transmitting the control signaling, the resource allocation manager 1225 is capable of, configured to, or operable to support a means for transmitting a downlink control information indicating the resource allocation.

In some examples, the candidate set of slots include slots scheduled after a duration after transmission of the control signaling.

Figure 13:
FIG. 13 shows a diagram of a system including a device that supports TBoMS with SBFD operation in accordance with one or more aspects of the present disclosure.

FIG. 13 shows a diagram of a system 1300 including a device 1305 that supports TBoMS with SBFD operation in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting TBoMS with SBFD operation). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 is capable of, configured to, or operable to support a means for transmitting, to a UE, control signaling indicating a resource allocation for a transmission of a TB across multiple slots by the UE, where the resource allocation includes an FDRA indicative of a first set of frequency resources and a TDRA indicative of a set of candidate slots for the transmission of the TB, where the set of candidate slots includes one or more uplink slots and one or more downlink slots configured with an uplink subband, where the uplink subband includes a second set of frequency resources, and where the control signaling indicates a quantity of slots for the transmission of the TB. The communications manager 1320 is capable of, configured to, or operable to support a means for identifying a set of available slots from the set of candidate slots in accordance with a slot selection scheme, where a quantity of slots of the set of available slots is equal to the quantity of slots for the transmission of the TB. The communications manager 1320 is capable of, configured to, or operable to support a means for receiving, from the UE, the TB over the set of available slots, where a quantity of information bits included in the TB is based on the set of available slots.

By including or configuring the communications manager 1320 in accordance with examples as described herein, the device 1305 may support techniques for improved communication reliability, reduced latency, improved user experience related to reduced processing, more efficient utilization of communication resources, improved coordination between devices, and improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of TBoMS with SBFD operation as described herein, or the processor 1335 and the memory 1325 may be otherwise configured to perform or support such operations.

FIG. 14 shows a flowchart illustrating a method 1400 that supports TBoMS with SBFD operation in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1405, the method may include receiving control signaling indicating a resource allocation for a transmission of a TB across multiple slots, wherein the resource allocation comprises an FDRA indicative of a first set of frequency resources and a TDRA indicative of a set of candidate slots for the transmission of the TB, wherein the set of candidate slots includes one or more uplink slots and one or more downlink slots configured with an uplink subband wherein the uplink subband comprises a second set of frequency resources, and wherein the control signaling indicates a quantity of slots for the transmission of the TB. The operations of 1405 may be performed in accordance with examples as disclosed herein. In some examples, aspects of the operations of 1405 may be performed by a resource allocation manager 825 as described with reference to FIG. 8.

At 1410, the method may include identifying a set of available slots from the set of candidate slots in accordance with a slot selection scheme, wherein a quantity of slots of the set of available slots is equal to the quantity of slots for the transmission of the TB. The operations of 1410 may be performed in accordance with examples as disclosed herein. In some examples, aspects of the operations of 1410 may be performed by an available slots manager 830 as described with reference to FIG. 8.

At 1415, the method may include transmitting the TB over the set of available slots, wherein a quantity of information bits included in the TB is based at least in part on the set of available slots. The operations of 1415 may be performed in accordance with examples as disclosed herein. In some examples, aspects of the operations of 1415 may be performed by a TB transmission manager 835 as described with reference to FIG. 8.

FIG. 15 shows a flowchart illustrating a method 1500 that supports TBoMS with SBFD operation in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1505, the method may include receiving control signaling indicating a resource allocation for a transmission of a TB across multiple slots, wherein the resource allocation comprises an FDRA indicative of a first set of frequency resources and a TDRA indicative of a set of candidate slots for the transmission of the TB, wherein the set of candidate slots includes one or more uplink slots and one or more downlink slots configured with an uplink subband wherein the uplink subband comprises a second set of frequency resources, and wherein the control signaling indicates a quantity of slots for the transmission of the TB. The operations of 1505 may be performed in accordance with examples as disclosed herein. In some examples, aspects of the operations of 1505 may be performed by a resource allocation manager 825 as described with reference to FIG. 8.

At 1510, the method may include identifying a set of available slots from the set of candidate slots in accordance with a slot selection scheme, wherein a quantity of slots of the set of available slots is equal to the quantity of slots for the transmission of the TB. The operations of 1510 may be performed in accordance with examples as disclosed herein. In some examples, aspects of the operations of 1510 may be performed by an available slots manager 830 as described with reference to FIG. 8.

At 1515, the method may include identifying a set of uplink slots from the set of candidate slots that are first available in time, wherein the set of available slots is the set of uplink slots, and wherein the quantity of information bits is based at least in part on the set of available slots being uplink slots. The operations of 1515 may be performed in accordance with examples as disclosed herein. In some examples, aspects of the operations of 1515 may be performed by an available slots manager 830 as described with reference to FIG. 8.

At 1520, the method may include transmitting the TB over the set of available slots, wherein a quantity of information bits included in the TB is based at least in part on the set of available slots. The operations of 1520 may be performed in accordance with examples as disclosed herein. In some examples, aspects of the operations of 1520 may be performed by a TB transmission manager 835 as described with reference to FIG. 8.

FIG. 16 shows a flowchart illustrating a method 1600 that supports TBoMS with SBFD operation in accordance with aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the wireless network entity to perform the described functions. Additionally, or alternatively, the wireless network entity may perform aspects of the described functions using special-purpose hardware.

At 1605, the method may include transmitting, to a UE, control signaling indicating a resource allocation for a transmission of a TB across multiple slots by the UE, wherein the resource allocation comprises an FDRA indicative of a first set of frequency resources and a TDRA indicative of a set of candidate slots for the transmission of the TB, wherein the set of candidate slots includes one or more uplink slots and one or more downlink slots configured with an uplink subband, wherein the uplink subband comprises a second set of frequency resources, and wherein the control signaling indicates a quantity of slots for the transmission of the TB. The operations of 1605 may be performed in accordance with examples as disclosed herein. In some examples, aspects of the operations of 1605 may be performed by a resource allocation manager 1225 as described with reference to FIG. 12.

At 1610, the method may include identifying a set of available slots from the set of candidate slots in accordance with a slot selection scheme, wherein a quantity of slots of the set of available slots is equal to the quantity of slots for the transmission of the TB. The operations of 1610 may be performed in accordance with examples as disclosed herein. In some examples, aspects of the operations of 1610 may be performed by an available slots manager 1230 as described with reference to FIG. 12.

At 1615, the method may include receiving, from the UE, the TB over the set of available slots, wherein a quantity of information bits included in the TB is based at least in part on the set of available slots. The operations of 1615 may be performed in accordance with examples as disclosed herein. In some examples, aspects of the operations of 1615 may be performed by a TB receiving manager 1235 as described with reference to FIG. 12.

The following provides an overview of aspects of the present disclosure:

Aspect 1: A method for wireless communications at a UE, comprising: receiving control signaling indicating a resource allocation for a transmission of a TB across multiple slots, wherein the resource allocation comprises a FDRA indicative of a first set of frequency resources and a TDRA indicative of a set of candidate slots for the transmission of the TB, wherein the set of candidate slots includes one or more uplink slots and one or more downlink slots configured with an uplink subband, wherein the uplink subband comprises a second set of frequency resources, and wherein the control signaling indicates a quantity of slots for the transmission of the TB; identifying a set of available slots from the set of candidate slots in accordance with a slot selection scheme, wherein a quantity of slots of the set of available slots is equal to the quantity of slots for the transmission of the TB; and transmitting the TB over the set of available slots, wherein a quantity of information bits included in the TB is based at least in part on the set of available slots.

Aspect 2: The method of aspect 1, wherein identifying the set of available slots from the set of candidate slots in accordance with the slot selection scheme comprises: identifying a set of uplink slots from the set of candidate slots that are first available in time, wherein the set of available slots is the set of uplink slots, and wherein the quantity of information bits is based at least in part on the set of available slots being uplink slots.

Aspect 3: The method of aspect 1, further comprising: determining the quantity of information bits based at least in part on a first quantity of uplink slots included in the set of candidate slots and a second quantity of downlink slots configured with the uplink subband included in the set of candidate slots.

Aspect 4: The method of aspect 3, wherein determining the quantity of information bits comprises: determining, based at least in part on the first set of frequency resources, a first quantity of REs available for transmission of information bits in each uplink slot; and determining, based at least in part on an overlap between the first set of frequency resources and the second set of frequency resources, a second quantity of REs available for transmission of information bits in each downlink slot configured with the uplink subband.

Aspect 5: The method of aspect 1, further comprising: determining the quantity of information bits based at least in part on a determination of a quantity of REs available for transmission of information bits in each slot of the set of candidate slots based at least in part on the first set of frequency resources, wherein the set of available slots comprises at least one uplink slot and at least one downlink slot configured with the uplink subband.

Aspect 6: The method of aspect 1, further comprising: determining the quantity of information bits based at least in part on a determination of a quantity of REs available for transmission of information bits in each slot of the set of candidate slots based at least in part on a minimum between the first set of frequency resources and the second set of frequency resources, wherein the set of available slots comprises at least one uplink slot and at least one downlink slot configured with the uplink subband.

Aspect 7: The method of aspect 1, wherein identifying the set of available slots from the set of candidate slots in accordance with the slot selection scheme comprises: identifying a set of slots from the set of candidate slots that are first available in time, the set of slots comprising at least one uplink slot and at least one downlink slots configured with the uplink subband.

Aspect 8: The method of aspect 1, wherein identifying the set of available slots from the set of candidate slots in accordance with the slot selection scheme comprises: identifying a set of downlink slots configured with the uplink subband from the set of candidate slots that are first available in time, wherein the set of available slots is the set of downlink slots configured with the uplink subband.

Aspect 9: The method of aspect 8, wherein the quantity of information bits is based at least in part on the uplink subband comprising the second set of frequency resources.

Aspect 10: The method of any of aspects 1 through 9, wherein receiving the control signaling comprises: receiving a downlink control information indicating the resource allocation.

Aspect 11: The method of any of aspects 1 through 10, wherein the candidate set of slots comprise slots scheduled after a duration after reception of the control signaling.

Aspect 12: A method for wireless communications at a network entity, comprising: transmitting, to a UE, control signaling indicating a resource allocation for a transmission of a TB across multiple slots by the UE, wherein the resource allocation comprises a FDRA indicative of a first set of frequency resources and a TDRA indicative of a set of candidate slots for the transmission of the TB, wherein the set of candidate slots includes one or more uplink slots and one or more downlink slots configured with an uplink subband, wherein the uplink subband comprises a second set of frequency resources, and wherein the control signaling indicates a quantity of slots for the transmission of the TB; identifying a set of available slots from the set of candidate slots in accordance with a slot selection scheme, wherein a quantity of slots of the set of available slots is equal to the quantity of slots for the transmission of the TB; and receiving, from the UE, the TB over the set of available slots, wherein a quantity of information bits included in the TB is based at least in part on the set of available slots.

Aspect 13: The method of aspect 12, wherein identifying the set of available slots from the set of candidate slots in accordance with the slot selection scheme comprises: identifying a set of uplink slots from the set of candidate slots that are first available in time, wherein the set of available slots is the set of uplink slots, and wherein the quantity of information bits is based at least in part on the set of available slots being uplink slots.

Aspect 14: The method of aspect 12, further comprising: determining the quantity of information bits based at least in part on a first quantity of uplink slots included in the set of candidate slots and a second quantity of downlink slots configured with the uplink subband included in the set of candidate slots.

Aspect 15: The method of aspect 14, further comprising: determining, based at least in part on the first set of frequency resources, a first quantity of REs available for transmission of information bits in each uplink slot; and determining, based at least in part on an overlap between the first set of frequency resources and the second set of frequency resources, a second quantity of REs available for transmission of information bits in each downlink slot configured with the uplink subband.

Aspect 16: The method of aspect 12, further comprising: determining the quantity of information bits based at least in part on a determination of a quantity of REs available for transmission of information bits in each slot of the set of candidate slots based at least in part on the first set of frequency resources, wherein the set of available slots comprises at least one uplink slot and at least one downlink slot configured with the uplink subband.

Aspect 17: The method of aspect 12, further comprising: determining the quantity of information bits based at least in part on a determination of a quantity of REs available for transmission of information bits in each slot of the set of candidate slots based at least in part on a minimum between the first set of frequency resources and the second set of frequency resources, wherein the set of available slots comprises at least one uplink slot and at least one downlink slot configured with the uplink subband.

Aspect 18: The method of aspect 12, wherein identifying the set of available slots from the set of candidate slots in accordance with the slot selection scheme comprises: identifying a set of slots from the set of candidate slots that are first available in time, the set of slots comprising at least one uplink slot and at least one downlink slots configured with the uplink subband.

Aspect 19: The method of aspect 12, wherein identifying the set of available slots from the set of candidate slots in accordance with the slot selection scheme comprises: identifying a set of downlink slots configured with the uplink subband from the set of candidate slots that are first available in time, wherein the set of available slots is the set of downlink slots configured with the uplink subband.

Aspect 20: The method of aspect 19, wherein the quantity of information bits is based at least in part on the uplink subband comprising the second set of frequency resources.

Aspect 21: The method of any of aspects 12 through 20, wherein transmitting the control signaling comprises: transmitting a downlink control information indicating the resource allocation.

Aspect 22: The method of any of aspects 12 through 21, wherein the candidate set of slots comprise slots scheduled after a duration after transmission of the control signaling.

Aspect 23: An apparatus for wireless communications at a UE, comprising a processor; memory coupled with the processor; and instructions stored in the memory and executable by the processor to cause the apparatus to perform a method of any of aspects 1 through 11.

Aspect 24: An apparatus for wireless communications at a UE, comprising at least one means for performing a method of any of aspects 1 through 11.

Aspect 25: A non-transitory computer-readable medium storing code for wireless communications at a UE, the code comprising instructions executable by a processor to perform a method of any of aspects 1 through 11.

Aspect 26: An apparatus for wireless communications at a network entity, comprising a processor; memory coupled with the processor; and instructions stored in the memory and executable by the processor to cause the apparatus to perform a method of any of aspects 12 through 22.

Aspect 27: An apparatus for wireless communications at a network entity, comprising at least one means for performing a method of any of aspects 12 through 22.

Aspect 28: A non-transitory computer-readable medium storing code for wireless communications at a network entity, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   one or more memories coupled with the one or more processors; and
   instructions stored in the one or more memories memory and executable by the one or more processor to cause the apparatus to:
   receive control signaling indicating a resource allocation for a transmission of a transport block across multiple slots, wherein the resource allocation comprises a frequency domain resource allocation indicative of a first set of frequency resources and a time domain resource allocation indicative of a set of candidate slots for the transmission of the transport block, wherein the set of candidate slots includes one or more uplink slots and one or more downlink slots configured with an uplink subband, wherein the uplink subband comprises a second set of frequency resources, and wherein the control signaling indicates a quantity of slots for the transmission of the transport block;
   identify a set of available slots from the set of candidate slots in accordance with a slot selection scheme, wherein a quantity of slots of the set of available slots is equal to the quantity of slots for the transmission of the transport block;

determine, based at least in part on the first set of frequency resources, a first quantity of resource elements available for transmission of information bits in each uplink slot;

determine, based at least in part on an overlap between the first set of frequency resources and the second set of frequency resources, a second quantity of resource elements available for transmission of information bits in each downlink slot configured with the uplink subband; and transmit the transport block over the set of available slots, wherein a quantity of information bits included in the transport block is based at least in part on a first quantity of uplink slots included in the set of candidate slots and a second quantity of downlink slots configured with the uplink subband included in the set of candidate slots.

2. The apparatus of claim 1, wherein the instructions are further executable by the one or more processors to cause the apparatus to:

determine the quantity of information bits based at least in part on a determination of a quantity of resource elements available for transmission of information bits in the first quantity of uplink slots included in the set of candidate slots and the second quantity of downlink slots configured with the uplink subband included in the set of candidate slots.

3. The apparatus of claim 1, wherein the instructions to receive the control signaling are executable by the one or more processors to cause the apparatus to:

receive a downlink control information indicating the resource allocation.

4. The apparatus of claim 1, wherein the set of candidate slots comprise slots scheduled after a duration after reception of the control signaling.

5. An apparatus for wireless communications at a user equipment (UE), comprising:

one or more processors;

one or more memories coupled with the one or more processors; and instructions stored in the one or more memories and executable by the one or more processors to cause the apparatus to:

receive control signaling indicating a resource allocation for a transmission of a transport block across multiple slots, wherein the resource allocation comprises a frequency domain resource allocation indicative of a first set of frequency resources and a time domain resource allocation indicative of a set of candidate slots for the transmission of the transport block, wherein the set of candidate slots includes one or more uplink slots and one or more downlink slots configured with an uplink subband, wherein the uplink subband comprises a second set of frequency resources, and wherein the control signaling indicates a quantity of slots for the transmission of the transport block;

identify a set of available slots from the set of candidate slots, wherein a quantity of slots of the set of available slots is equal to the quantity of slots for the transmission of the transport block, wherein to identify the set of available slots, the instructions are executable to cause the apparatus to:

identify a set of slots from the set of candidate slots that are first available in time, the set of slots comprising at least one uplink slot and at least one downlink slot configured with the uplink subband; or identify a set of downlink slots configured with the uplink subband from the set of candidate slots that are first available in time, the set of available slots is the set of downlink slots configured with the uplink subband; and transmit the transport block over the set of available slots, wherein a quantity of information bits included in the transport block is based at least in part on the set of available slots.

6. The apparatus of claim 5, wherein the instructions are further executable by the one or more processors to cause the apparatus to:

determine the quantity of information bits based at least in part on a determination of a quantity of resource elements available for transmission of information bits in the second quantity of downlink slots configured with the uplink subband included in the set of candidate slots based at least in part on a minimum between the first set of frequency resources and the second set of frequency resources.

7. The apparatus of claim 5, wherein the instructions to identify the set of available slots from the set of candidate slots are executable by the one or more processors to cause the apparatus to:

identify the set of downlink slots configured with the uplink subband from the set of candidate slots that are first available in time.

8. The apparatus of claim 7, wherein the quantity of information bits is based at least in part on the uplink subband comprising the second set of frequency resources.

9. The apparatus of claim 5, wherein the instructions to identify the set of available slots from the set of candidate slots are executable by the one or more processors to cause the apparatus to:

identify the set of slots from the set of candidate slots that are first available in time, the set of slots comprising at least one uplink slot and at least one downlink slot configured with the uplink subband.

10. An apparatus for wireless communications at a network entity, comprising:

one or more processors;

one or more memories coupled with the one or more processors; and instructions stored in the one or more memories and executable by the one or more processors to cause the apparatus to:

transmit, to a user equipment (UE), control signaling indicating a resource allocation for a transmission of a transport block across multiple slots by the UE, wherein the resource allocation comprises a frequency domain resource allocation indicative of a first set of frequency resources and a time domain resource allocation indicative of a set of candidate slots for the transmission of the transport block, wherein the set of candidate slots includes one or more uplink slots and one or more downlink slots configured with an uplink subband, wherein the uplink subband comprises a second set of frequency resources, and wherein the control signaling indicates a quantity of slots for the transmission of the transport block;

identify a set of available slots from the set of candidate slots in accordance with a slot selection scheme, wherein a quantity of slots of the set of available slots is equal to the quantity of slots for the transmission of the transport block;

determine, based at least in part on the first set of frequency resources, a first quantity of resource elements available for transmission of information bits in each uplink slot;

determine, based at least in part on an overlap between the first set of frequency resources and the second set of frequency resources, a second quantity of resource elements available for transmission of information bits in each downlink slot configured with the uplink subband; and receive, from the UE, the transport block over the set of available slots, wherein a quantity of information bits included in the transport block is based at least in part on a first quantity of uplink slots included in the set of candidate slots and a second quantity of downlink slots configured with the uplink subband included in the set of candidate slots.

11. The apparatus of claim 10, wherein the instructions are further executable by the one or more processors to cause the apparatus to:

determine the quantity of information bits based at least in part on a determination of a quantity of resource elements available for transmission of information bits in the first quantity of uplink slots included in the set of candidate slots and the second quantity of downlink slots configured with the uplink subband included in the set of candidate slots.

12. An apparatus for wireless communications at a network entity, comprising:

one or more processors;

one or more memories coupled with the one or more processors; and instructions stored in the one or more memories and executable by the one or more processors to cause the apparatus to:

transmit, to a user equipment (UE), control signaling indicating a resource allocation for a transmission of a transport block across multiple slots by the UE, wherein the resource allocation comprises a frequency domain resource allocation indicative of a first set of frequency resources and a time domain resource allocation indicative of a set of candidate slots for the transmission of the transport block, wherein the set of candidate slots includes one or more uplink slots and one or more downlink slots configured with an uplink subband, wherein the uplink subband comprises a second set of frequency resources, and wherein the control signaling indicates a quantity of slots for the transmission of the transport block;

identify a set of available slots from the set of candidate slots, wherein a quantity of slots of the set of available slots is equal to the quantity of slots for the transmission of the transport block, wherein to identify the set of available slots, the instructions are executable to cause the apparatus to:

identify a set of slots from the set of candidate slots that are first available in time, the set of slots comprising at least one uplink slot and at least one downlink slot configured with the uplink subband; or identify a set of downlink slots configured with the uplink subband from the set of candidate slots that are first available in time, the set of available slots is the set of downlink slots configured with the uplink subband; and receive, from the UE, the transport block over the set of available slots, wherein a quantity of information bits included in the transport block is based at least in part on the set of available slots.

13. The apparatus of claim 10, wherein the instructions to transmit the control signaling are executable by the one or more processors to cause the apparatus to:

transmit a downlink control information indicating the resource allocation.

14. The apparatus of claim 10, wherein the set of candidate slots comprise slots scheduled after a duration after transmission of the control signaling.

15. The apparatus of claim 12, wherein the instructions are further executable by the one or more processors to cause the apparatus to:

determine the quantity of information bits based at least in part on a determination of a quantity of resource elements available for transmission of information bits in the second quantity of downlink slots configured with the uplink subband included in the set of candidate slots based at least in part on a minimum between the first set of frequency resources and the second set of frequency resources.

16. The apparatus of claim 12, wherein the instructions to identify the set of available slots from the set of candidate slots are executable by the one or more processors to cause the apparatus to:

identify the set of downlink slots configured with the uplink subband from the set of candidate slots that are first available in time.

17. The apparatus of claim 16, wherein the quantity of information bits is based at least in part on the uplink subband comprising the second set of frequency resources.

18. The apparatus of claim 12, wherein the instructions to identify the set of available slots from the set of candidate slots are executable by the one or more processors to cause the apparatus to:

identify the set of slots from the set of candidate slots that are first available in time, the set of slots comprising at least one uplink slot and at least one downlink slot configured with the uplink subband.

* * * * *